US011310537B2

(12) United States Patent
Gadgil et al.

(10) Patent No.: US 11,310,537 B2
(45) Date of Patent: Apr. 19, 2022

(54) LINEAR ENCODER FOR IMAGE/VIDEO PROCESSING

(71) Applicant: DOLBY LABORATORIES LICENSING CORPORATION, San Francisco, CA (US)

(72) Inventors: Neeraj J. Gadgil, Sunnyvale, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 32 days.

(21) Appl. No.: 16/975,096

(22) PCT Filed: Feb. 28, 2019

(86) PCT No.: PCT/US2019/020115
§ 371 (c)(1),
(2) Date: Aug. 21, 2020

(87) PCT Pub. No.: WO2019/169174
PCT Pub. Date: Sep. 6, 2019

(65) Prior Publication Data
US 2021/0092461 A1   Mar. 25, 2021

Related U.S. Application Data

(60) Provisional application No. 62/636,388, filed on Feb. 28, 2018.

(30) Foreign Application Priority Data

Feb. 28, 2018 (EP) .................................... 18159055

(51) Int. Cl.
*H04N 19/98* (2014.01)
*H04N 19/132* (2014.01)
(Continued)

(52) U.S. Cl.
CPC ............... *H04N 19/98* (2014.11); *G06F 1/03* (2013.01); *H04N 19/132* (2014.11); *H04N 19/182* (2014.11); *H04N 19/186* (2014.11)

(58) Field of Classification Search
CPC .. H04N 19/117; H04N 19/132; H04N 19/142; H04N 19/182; H04N 19/184;
(Continued)

(56) References Cited

U.S. PATENT DOCUMENTS 9,264,681 B2   2/2016   Gish
9,497,456 B2   11/2016  Su
(Continued)

FOREIGN PATENT DOCUMENTS

CN   105324997    2/2016
KR   20200101990  8/2020
(Continued)

OTHER PUBLICATIONS

ITU-R Recommendation ITU-R BT.1886 "Reference Electro-Optical Transfer Function for Flat Panel Displays Used in HDTV Studio Production" Mar. 2011, pp. 1-7.
(Continued)

*Primary Examiner* — Nathnael Aynalem

(57) ABSTRACT

In some embodiments, an encoder device is disclosed to receive an input video stream containing images in a first dynamic range including a first image. The device receives a second image representing the first image. The device obtains statistical data for the first and the second images. The device determines, at a first time delay, a scene cut data from the input video stream and storing the scene cut data in a first sliding window. The device determines, at a second time delay, a first smoothing mapping function based on a second sliding window and the determined scene cut data. The device determines, at a third time delay, a second
(Continued)

smoothing mapping function based on a third sliding window and the determined scene cut data. The device generates, at the third time delay, a composer metadata for the first image based on the first and second smoothing mapping functions.

14 Claims, 15 Drawing Sheets

(51) Int. Cl.
*H04N 19/182* (2014.01)
*H04N 19/186* (2014.01)
*G06F 1/03* (2006.01)

(58) Field of Classification Search
CPC ...... H04N 19/186; H04N 19/46; H04N 19/98; G06F 1/03; G06T 5/007; G06T 2207/20208
USPC .................................. 375/240.01–240.29
See application file for complete search history.

(56) References Cited

U.S. PATENT DOCUMENTS

| | | | |
|---|---|---|---|
| 9,584,811 B2 | 2/2017 | Su | |
| 9,628,808 B2 | 4/2017 | Su | |
| 9,936,199 B2 | 4/2018 | Froehlich | |
| 10,264,287 B2 | 4/2019 | Wen | |
| 10,298,923 B2 | 5/2019 | Su | |
| 10,575,028 B2 | 2/2020 | Kadu | |
| 2014/0029675 A1 | 1/2014 | Su | |
| 2015/0326896 A1 | 11/2015 | Su | |
| 2016/0005349 A1 | 1/2016 | Atkins | |
| 2016/0065975 A1* | 3/2016 | Su | H04N 19/179 375/240.01 |
| 2017/0289555 A1 | 10/2017 | Su | |
| 2018/0007356 A1* | 1/2018 | Kadu | G06T 5/009 |
| 2018/0115774 A1* | 4/2018 | Su | H04N 19/136 |
| 2018/0115777 A1* | 4/2018 | Piramanayagam | H04N 19/587 |
| 2018/0144692 A1* | 5/2018 | Atkins | G09G 3/3406 |
| 2018/0220144 A1* | 8/2018 | Su | H04N 19/30 |
| 2019/0222866 A1* | 7/2019 | Song | H04N 19/186 |
| 2019/0272643 A1* | 9/2019 | Gadgil | G06T 9/00 |

FOREIGN PATENT DOCUMENTS

| | | |
|---|---|---|
| RU | 2015134416 | 2/2017 |
| WO | 2017003525 A1 | 1/2017 |
| WO | 2017015810 A1 | 2/2017 |
| WO | 2017165494 A2 | 9/2017 |
| WO | 2018136432 W | 7/2018 |
| WO | 2018231968 A1 | 12/2018 |
| WO | 2019160986 | 8/2019 |

OTHER PUBLICATIONS

Modulo Operations: https://en.wikipedia.org/wiki/Modulo_operation.

SMPTE 2084:2014 "High Dynamic Range Electro-Optical Transfer Function of Mastering Reference Displays" Aug. 16, 2014.

* cited by examiner

LINEAR ENCODER FOR IMAGE/VIDEO PROCESSING

CROSS-REFERENCE TO RELATED APPLICATIONS

This patent application claims the benefit of priority from U.S. Provisional Patent Application No. 62/636,388, filed on 28 Feb. 2018; and European Patent Application No. 18159055.5, filed on 28 Feb. 2018, each one incorporated by reference in its entirety.

TECHNICAL FIELD

The present disclosure relates generally to image/video. More particularly, the present disclosure relates to linear encoders for image/video processing.

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus, while perhaps somewhat narrower in relation to true scene referred HDR, EDR nonetheless represents a wide DR breadth and may also be referred to as HDR. As used herein, the term "iDM" (short for inverse display-mapped signal), may also refer to EDR or HDR signals that were created based on an input standard dynamic range (SDR) signal.

In practice, images comprise one or more color components (e.g., luma Y and chroma Cb and Cr), where each color component is represented by a precision of n-bits per pixel (e.g., n=8 or n=10). Using linear luminance coding, for example, images where n≤8 (e.g., color 24-bit JPEG images) or sometimes n≤10 are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays based on measured characteristics of the Cathode Ray Tube (CRT). Given a video stream, information about its EOTF is typically embedded in the bit stream as metadata. As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, and other types of metadata described herein.

Most consumer desktop displays currently support luminance of 200 to 300 cd/m$^2$ or nits. Most consumer HDTVs range from 300 to 500 nits with new models reaching 1000 nits (cd/m$^2$). Such displays thus typify a lower dynamic range (LDR), also referred to as a standard dynamic range (SDR), in relation to HDR or EDR. HDR content may be displayed on HDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE ST 2084: 2014 "High Dynamic Range EOTF of Mastering Reference Displays," which is incorporated herein by reference in its entirety. In general, without limitation, the methods of the present disclosure relate to any dynamic range higher than SDR.

SUMMARY OF THE INVENTION

A first aspect of the invention relates to a method for luma and/or chroma reshaping metadata generation with a processing system, the method comprising receiving an input video stream containing images in a first dynamic range including a first image, receiving a second image representing the first image of the input video stream, the second image having a second dynamic range, wherein the second dynamic range is higher than the first dynamic range, obtaining statistical data for the first and the second images, wherein the obtained statistical data includes luminance and chroma statistics for the first and second images, and storing the statistical data in a buffer. The method further comprises determining, at a first time delay, scene cut data based on the statistical data in a first sliding window (L3) including the first image, one or more look ahead images after the first image in time in the input video stream, and one or more look back images before the first image in time in the input video stream, determining, at a second time delay, a first mapping function for mapping luminance values for the first image from the first dynamic range into the second dynamic range based on the statistical data and determined scene cut data in a second sliding window (L2), determining, at a third time delay, a second mapping function by performing a smoothing operation to the first mapping function based on the first mapping function and the determined scene cut data in a third sliding window (L1), determining, at the third time delay, a third mapping function for mapping chroma values for the first image from the first dynamic range into the second dynamic range based on the statistical data and the determined scene cut data in the third sliding window (L1), and generating, at the third time delay, a composer metadata for the first image based on the second and the third mapping functions, wherein the generated composer metadata are used by a target display device to map the first image from the first dynamic range into the second dynamic range for display.

A "sliding window" basically refers to a set of image frames, and various processing steps are performed based on statistical data for images in such a sliding window. Specifically, first sliding window (L3) includes a first image at a first dime delay, one or more look ahead images after the first image in time in the input video stream, and one or more look back images before the first image in time in the input video stream. The second sliding window (L2) includes a second image at a second time delay, one or more look ahead images after the second image in time in the input video stream, and one or more look back images before the second image in time in the input video stream. The third sliding window (L1) includes a third image at a third time delay, one or more look ahead images after the third image in time in the input video stream, and one or more look back images before the third image in time in the input video stream.

Each sliding window may be implemented as a ring memory buffer, for storing output generated by a previous sliding window. A ring memory buffer will always include only a "window" of a consecutive stream of output data.

It is noted that "time delay" refers to delay in a frame-based time scale and is related to data-dependency. Several operations, including consecutive operations, may be performed in one timeframe, and several frames are processed before the next "time delay". Indeed, the next time delay is specifically selected such that the previous operations may be completed. Specifically, the required time delay must be at least equal to the number of "look ahead" frames in a specific sliding window.

The processing at one time delay may be based at least in part on results from processing at an earlier time delay. For example, the processing at the second and third time delays (using the second and third sliding windows) may be based on the scene cut data determined at the first time delay, using the first sliding window. Such scene cut data may be used to define a smaller "sub-window", such that data for images in this smaller window is used in the processing.

BRIEF DESCRIPTION OF THE DRAWINGS

The present embodiments are illustrated by way of example and not limitation in the figures of the accompanying drawings in which like references indicate similar elements.

DESCRIPTION OF EXAMPLE EMBODIMENTS

Figure 1:
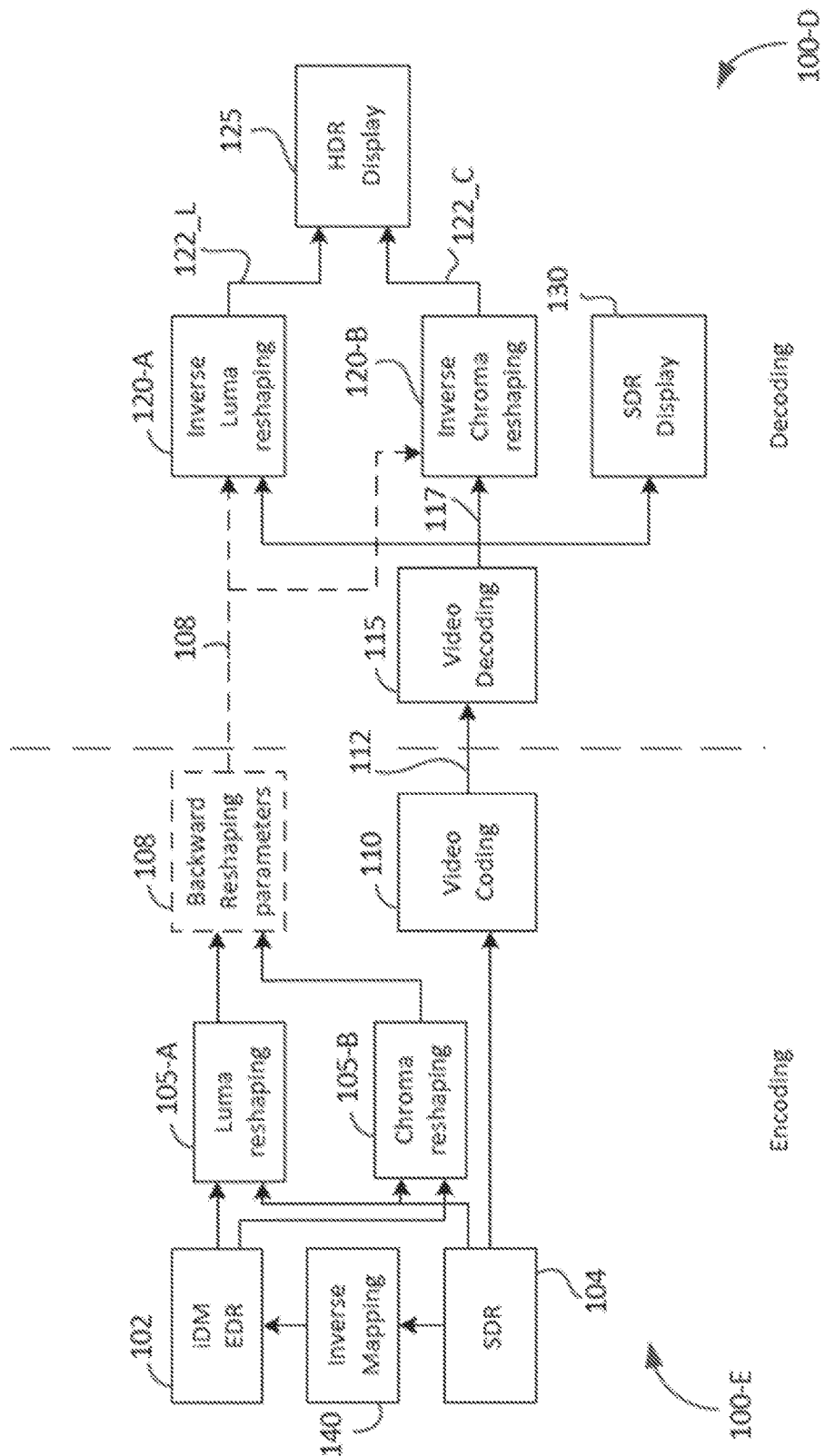
FIG. 1 illustrates an example process for data coding and decoding using reshaping techniques according to an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

As used herein, the term "PDF" refers to probability distribution function. "CDF" refers to cumulative distribution function. An SDR or HDR histogram may be constructed based on a distribution of codewords in one or more of the SDR or HDR images respectively and the histogram can represent a PDF. "Codeword" refers to a sequence of bit information to represent a color pixel or grayscale pixel. For example, '00000000' may represent pixel color black for an 8-bit codeword. "Codeword bin" or "bin" refers to a particular codeword in a predefined sequence or set of codewords. The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In one embodiment, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve imitates the true visual response of the human visual system using a relatively simple functional model.

For example, under SMPTE ST 2084, at 1 cd/m2, one 12-bit code value or codeword corresponds to a relative change of approximately 0.0048 cd/m2; however, at 1,000 cd/m2, one 12-bit code value or codeword corresponds to a relative change of approximately 2.24 cd/m2. This nonlinear quantization is needed to accommodate for the non-linear contrast sensitivity of the human visual system (HVS).

According to some embodiments, a linear encoder for generating metadata that specifies the SDR to HDR conversion mappings for luma and chroma components is disclosed. In one embodiment, a system receives an input video stream. The system stores over time, in a first buffer, statistical data for a first set of successive portions of the input video stream, the first buffer to provide, for each successive portion, an output representing scene cut data such as data that indicates the end of one scene in the content and the beginning of the next scene in the content. The system stores over time, in a second buffer, statistical data for a second set of successive portions of the input video stream, the second buffer receiving each output provided from the first buffer, the second buffer to provide, for each successive portion, an output representing a luminance mapping value. The system stores over time, in a third buffer, statistical data for a third set of successive portions of the input video stream, the third buffer receiving each output provided from the second buffer, the third buffer to provide, for each successive portion, an output representing a chroma mapping value. The system generates metadata for a first image in the input video stream based on an associated luminance mapping value and an associated chroma mapping value, the metadata for use by a target display to generate a second image based on the first image but having a higher dynamic range than the first image.

According to some embodiments, a linear encoder for generating metadata that specifies the SDR to HDR conversion mappings for luma and chroma components with EDR reference is disclosed. In one embodiment, a system receives an input video stream containing images in a first dynamic range including a first image. The system receives a second image representing the first image of the input video stream, the second image having a second dynamic range and the second dynamic range is higher than the first dynamic range. The system obtains statistical data for the first and the second images. The system determines, at a first time delay, a scene cut data from data representing images in the input video stream and stores the scene cut data in a first sliding window, the scene cut data determined based on the statistical data of the first image, the statistical data of one or more look ahead images after the first image in time in the input video stream, and the statistical data of one or more look back images before the first image in time in the input video stream.

The system determines, at a second time delay, a first mapping function for mapping luminance values for the first image from the first dynamic range into the second dynamic range based on a second sliding window and the determined scene cut data. The system determines, at a third time delay, a second mapping function for mapping chroma values for the first image from the first dynamic range into the second dynamic range based on a third sliding window and the determined scene cut data. The system generates, at the third time delay, a composer metadata for the first image based on the first and second mapping functions, where the generated composer metadata are used by a target display device to map the first image from the first dynamic range into the second dynamic range for display.

According to some embodiments, a linear encoder for generating metadata that specifies the SDR to HDR conversion mappings for luma and chroma components using three dimensional (3D) mapping statistics is disclosed. In one embodiment, a system receiving an input video stream having a set of images, including a first image in a first dynamic range. The system generates 3D mapping statistics for the first image in the first dynamic range and a second image in a second dynamic range which corresponds to the first image, where the second dynamic range is higher than the first dynamic range. The system determines multivariate multiple regression (MMR) statistics based on the 3D mapping statistics to generate chroma mapping functions to estimate chroma channels values of the second image based on the first image. The system generates a composer metadata, where the composer metadata can comprise the chroma mapping functions to be used by a target display device to map chroma channels of the first image from the first dynamic range into the second dynamic range for display.

According to some embodiments, a linear encoder for generating metadata that specifies the SDR to HDR conversion mappings for luma and chroma components without an EDR reference is disclosed. In one embodiment, a system receives an input video stream containing images in a first dynamic range including a first image. The system obtains statistical data for a first image of the input video stream, where the statistical data includes one or more image-related features from the first image. The system determines, at a first time delay, a scene cut data from data representing images in the input video stream and storing the scene cut data in a first sliding window based on the statistical data of the first image, the statistical data of one or more look ahead images after the first image in time in the input video stream, and the statistical data of one or more look back images before the first image in time in the input video stream. The system determines, at a second time delay, a first mapping function for mapping luminance values for the first image from the first dynamic range into a second dynamic range based on a second sliding window and a machine learning model, where the second dynamic range is higher than the first dynamic range. The system generates, at a third time delay, a composer metadata for the first image based on the first and a second mapping functions, where the second mapping functions maps chroma color channels for the first image from the first dynamic range into the second dynamic range based on the machine learning model, where the generated composer metadata are used by a target display device to display a second image, which corresponds to the first image in the second dynamic range.

As used herein, the term "reshaping" refers to a pre-processing operation on an HDR image, such as scaling, quantization, and the like, to map it from its original bit depth to an image of a lower or the same bit depth, to allow for more efficient coding using existing coding standards and devices. "Backward reshaping" is used to describe a mapping or pre-processing operation from SDR to HDR. As appreciated by the inventors here, improved techniques for encoding and decoding video data that can be used to support display capabilities of a wide variety of SDR and HDR display and/or decoder devices are desired.

Example Video Delivery Processing Pipeline

Most digital interfaces for video delivery, such as the Serial Digital Interface (SDI), are currently limited to 12 bits per pixel per component. Furthermore, most practical implementations of compression standards, such as H.264 (or AVC) and H.265 (or HEVC), are currently limited to 10-bits per pixel per component. Efficient encoding and/or quantization is required to support HDR content, with dynamic range from approximately 0.001 to 10,000 cd/m$^2$ (or nits), within existing infrastructures and compression standards. Moreover, there is a need for an encoder that will generate for each frame, on-the-fly, metadata for converting SDR content to HDR content.

FIG. 1 depicts an example process 100 for data encoding and decoding using luma and chroma reshaping according to an embodiment. In one embodiment, in an encoder 100-E, a video sequence may be available in both high dynamic range (EDR, 102) and standard dynamic range (SDR, 104) formats. Input 102 may be coded according to a certain EOTF (e.g., gamma, ST 2084). In an embodiment, the EDR sequence (referred herein also as iDM EDR) may be generated based on the SDR sequence using an inverse mapping process (iDM) 140.

Given input EDR and SDR signals, luma reshaping 105-A and chroma reshaping 105-B processes, may be applied to generate parameters 108 for backward or inverse reshaping functions 120. Parameters 108 when applied to the SDR input in a decoder can generate an HDR output for display.

After reshaping 105, the original input SDR video signal 104 is passed to encoding block 110 to be delivered downstream to decoding and playback devices such as handheld devices such as smartphones, television sets, set-top boxes, movie theaters, etc. In some embodiments, coding block 110 may include audio and video encoders, such as those defined by ATSC, DVB, DVD, Blu-Ray, and other delivery formats, to generate coded bit stream 112. Coded data 112 and the backward reshaping parameters 108 can be multiplexed into a coded bitstream to be stored or delivered to downstream decoding devices.

In an embodiment, backward reshaping parameters 108 may include static prediction coefficients or dynamic (non-static) prediction coefficients (e.g., generated with machine learning methods, etc.). These prediction coefficients can be directly used by a receiver 100-D (e.g., by inverse reshaping function 120) to predict some or all of HDR pixel values of HDR images from corresponding SDR pixel values of the SDR images 104.

In receiver 100-D, coded data 112 can be decoded by decoding unit 115 to generate decoded signal 117 to represent an identical or close approximation of SDR signal 104.

In a backward-compatible SDR decoder, decoded signal 117 may be displayed directly to SDR display 130. In an HDR decoder, following decoding 115, decoded signal 117 may be processed by a backward or inverse reshaping function 120 which is generated using the received backward reshaping parameters 108. Inverse reshaping can convert received SDR signal (e.g., SDR signal 117) to an approximation of the (higher) dynamic range signal 102, to be displayed on an HDR display 125. Inverse reshaping may include separate inverse luma reshaping 120-A and chroma reshaping 120-B functions. Depending on the transformations of the reshaper 105, inverse reshaping functions 120 may also include additional (inverse) processes, such as inverse tone-mapping, color transformations, etc. In some embodiments, the backward or inverse reshaping function 120 may be integrated with a de-quantizer in decoder 115, e.g., as part of the de-quantizer in an AVC or HEVC video decoder. In some embodiments, information about the backward reshaping parameters 108 may be communicated to downstream devices (such as decoders) using metadata, SEI messaging, etc.

Luma and Chroma Reshaping and Composer Metadata

As used herein, the term "composer metadata" (CM) denotes any metadata that are communicated from an encoder (100-E) to a decoder (100-D) to support the reconstruction (compositing) of EDR data (122). Such metadata can include all the backward reshaping parameters (108) needed for inverse or backward reshaping (120) in the decoder.

Let $f_L(I)$ denote a forward luma reshaping function and let $f_L^{-1}(I)$ denote its inverse, which when applied to the luma component of the decoder SDR data 117 can generate the luma component 122_L of the estimated EDR output 122. In an embodiment, the $f_L^{-1}(I)$ function may be communicated as a piece-wise function. Such a function can be fully represented by a) a set of pivot points dividing the range of input codewords in the SDR input into segments, b) the order of the polynomial in each segment, and c) the polynomial coefficients in each segment.

In an embodiment, chroma reshaping may be performed using a multivariate, multiple regression (MMR) predictor. Examples of such MMR predictors may be found in U.S. Pat. No. 8,811,490, which is incorporated herein by reference in its entirety. Such a predictor is characterized by a backward reshaping matrix M, which, when applied to decoded SDR data 117 generates chroma components 122_C of the estimated EDR output.

Thus, without limitation, in an embodiment, the composer metadata 108 may comprise a parametric representation of $f_L^{-1}(I)$ and a backward reshaping matrix M. Composer metadata may be updated at different levels of time intervals, such as: once for each sequence, for every scene, for each frame, or for clusters or groups of frames.

In some embodiments, generator 105 generates metadata or backward reshaping parameters by cumulative distribution function (CDF) based histogram approximation or CDF matching. Examples of such CDF matching may be found in U.S. Provisional Patent Application Ser. No. 62/385,307, "Coding of High Dynamic Range Video Using Segment-Based Reshaping," which is incorporated herein by reference in its entirety.

In one embodiment, a backward reshaping function (or parameters) includes a backward reshaping lookup table (BLUT). In some embodiments, backward reshaping data (e.g., analytical functions, non-analytical functions, lookup tables, sequences, etc.) that defines or specifies the backward reshaping function $\{T_{j,b}\}$ which can be included as a part of image metadata delivered to downstream devices along with the SDR image.

In some embodiments, a second order piecewise polynomial may be used to represent the backward reshaping function $\{T_{j,b}\}$ for a luma channel In some embodiments, backward reshaping metadata includes polynomial coefficients, pivots, offsets, etc., that define the set of polynomial pieces can be included as a part of image metadata delivered to downstream devices along with the SDR image.

A downstream device that receives the SDR image and the backward reshaping parameters or metadata may use the backward reshaping metadata to determine or reconstruct the backward reshaping function on a per scene basis (when the metadata is on a per scene basis) or on a per image basis (when the metadata is on a per image basis). The backward reshaping function can then be applied to the SDR image to reconstruct an HDR image.

In one embodiment, each color channel (I, CT, or Cp) can be approximated by a (single-channel) predictor. In one embodiment, each single-channel predictor corresponds to a backward reshaping lookup table (BLUT) that can be derived from the corresponding inverse mapping function for the particular color channel. The inverse mapping functions or backward reshaping functions can be generated by a backward reshaping function generator such as generator 105 of FIG. 1. The backward reshaping lookup tables or mapping tables can include SDR/HDR pairs to map an SDR codeword to an HDR codeword, or vice versa. In one embodiment, a metadata is generated based on the lookup table or mapping table such that the metadata can be transmitted along with the SDR data to downstream decoders. Downstream decoders can reconstruct an HDR image from the metadata and a corresponding SDR image. In another embodiment, backward reshaping functions can be generated by aggregating histograms for each color channel of a sample of pictures within a database. The aggregated histograms can then be used as the input iDM histograms for CDF-based histogram approximation to generate the backward reshaping functions. A metadata can then be generated from these backward reshaping functions. The metadata can be applied to corresponding SDR image(s) to reconstruct an HDR image.

Linear Encoding

Figure 2:
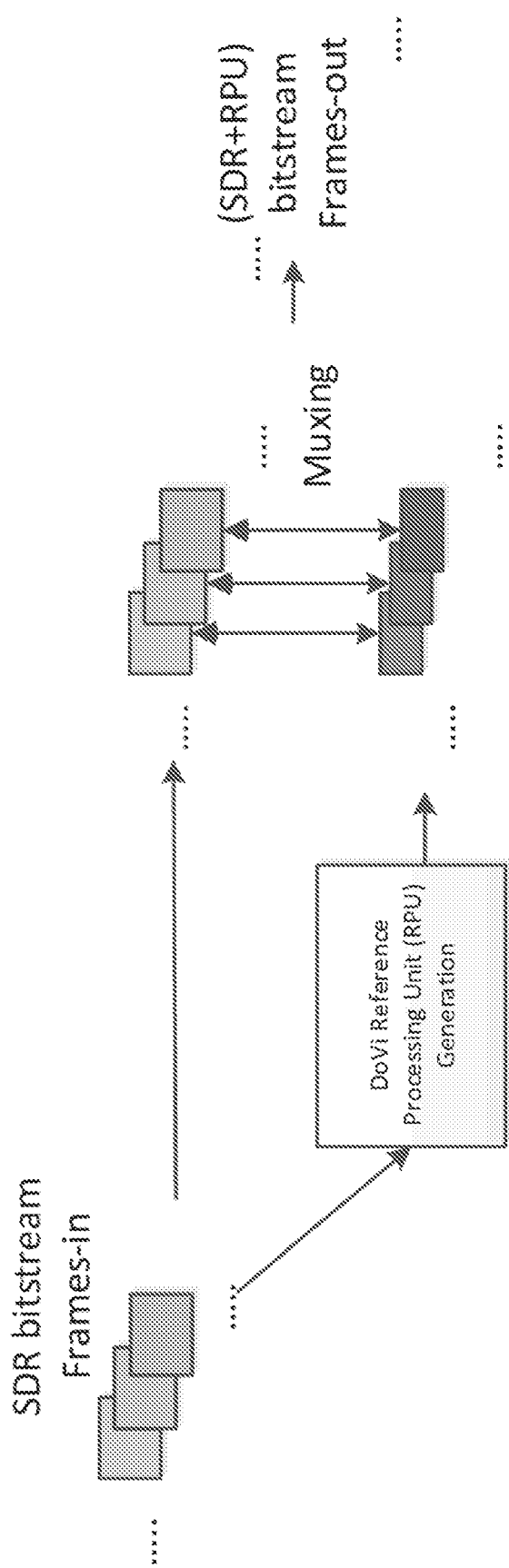
FIG. 2 illustrates an example process for encoding according to an embodiment.

FIG. 2 illustrates an example process for linear encoding according to an embodiment. Linear encoding refers to encoding with a constant feed-in and feed-out. A linear encoder can deliver an output data on each occurrence it accepts an input data. Linear encoder is different than coding systems that accept an entire input data over time, store and process the entire received input data to deliver an output for the whole data. In some scenarios, the linear encoder includes a constant but configurable delay between an input frame and a corresponding output frame. E.g., in a stable operating state, a linear encoder can accept an input image and simultaneously outputs RPU metadata (e.g., composer metadata and DM metadata, where DM metadata includes information specific to a target display) for another input image from a previous time frame. In one embodiment, a linear encoder can receive a real-time input data feed from a real-time live broadcast and provide a delayed output.

Linear encoding can perform "on-the-fly" encoding to generate a reference picture unit (RPU) (e.g., including backward reshaping parameters) metadata to convert SDR to HDR (or EDR) at a decoder. A linear encoder can encode a pre-stored or live standard dynamic range (SDR) video content. Unlike a scene-based or a segment-based encoder, in which future picture information are available, a linear encoder can only have a few look-ahead frames. The RPU generation is performed by the linear encoder on-the-fly and the RPU is mixed with the SDR bitstream before it is transmitted to a receiver/decoder. In other words, the linear encoder can be a one-pass solution.

Figure 3:
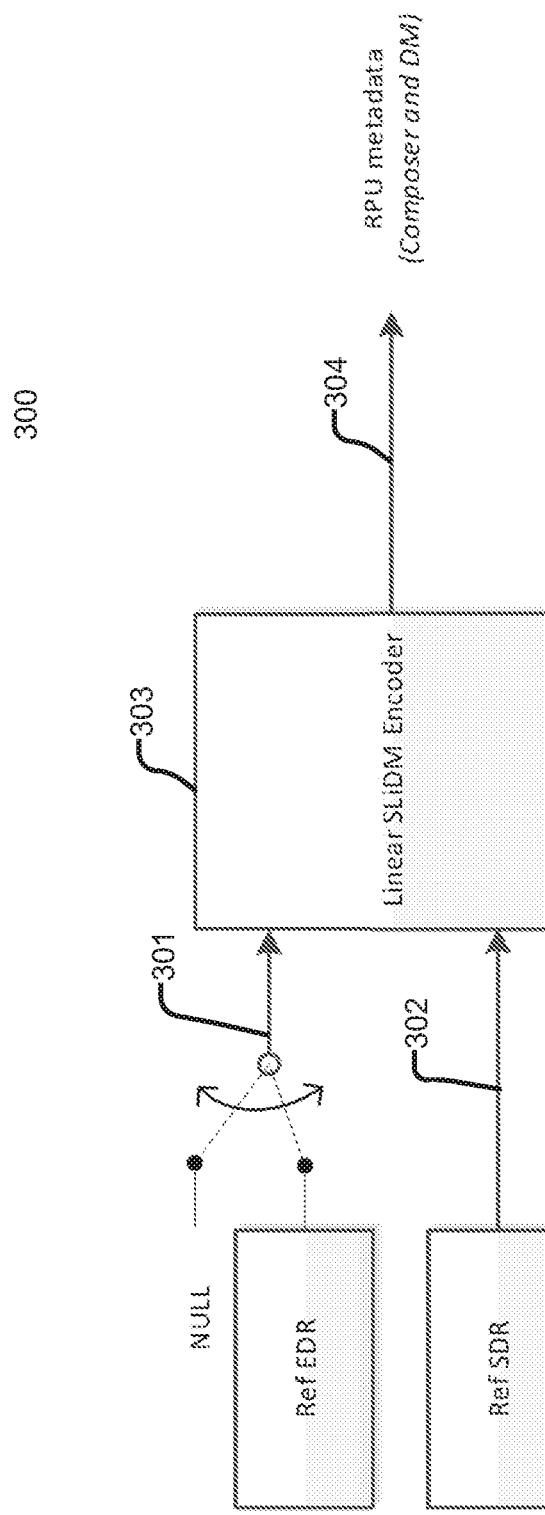
FIG. 3 illustrates an example process for encoding with or without reference EDR according to an embodiment.

FIG. 3 illustrates an example process for linear encoding with or without reference EDR images according to an embodiment. Process 300 includes two modes of operation. According to some embodiments, linear encoder 303 can operate in a "with HDR reference" mode or "without an HDR reference" mode and configures its modes of operation depending on whether input 301 includes an HDR reference image or if input 301 is a null input. For the "with HDR reference" mode, input SDR frames (or images) 302 and their corresponding reference HDR frames 301 together generates output RPU metadata 304. The reference HDR content 301 can be pre-generated for each input SDR frame or on-the-fly such as using an external inverse DM (EiDM) module. The generated output RPU metadata 304 can include dynamic mapping parameters for mapping luma and chroma components of the SDR input 302 to the HDR content 301.

For the "without HDR reference" mode, only input SDR frames (or images) 302 is used to generate output RPU metadata 304. The generated output RPU metadata 304 can include dynamic mapping parameters for mapping luma components and static mapping parameters for mapping chroma components of the SDR input 302 to the HDR content 301. In some embodiments, output RPU metadata 304 can include display management (DM) metadata which can be interpreted by a decoder for displaying HDR contents for specific target displays.

Linear Encoding Architecture

Figure 4:
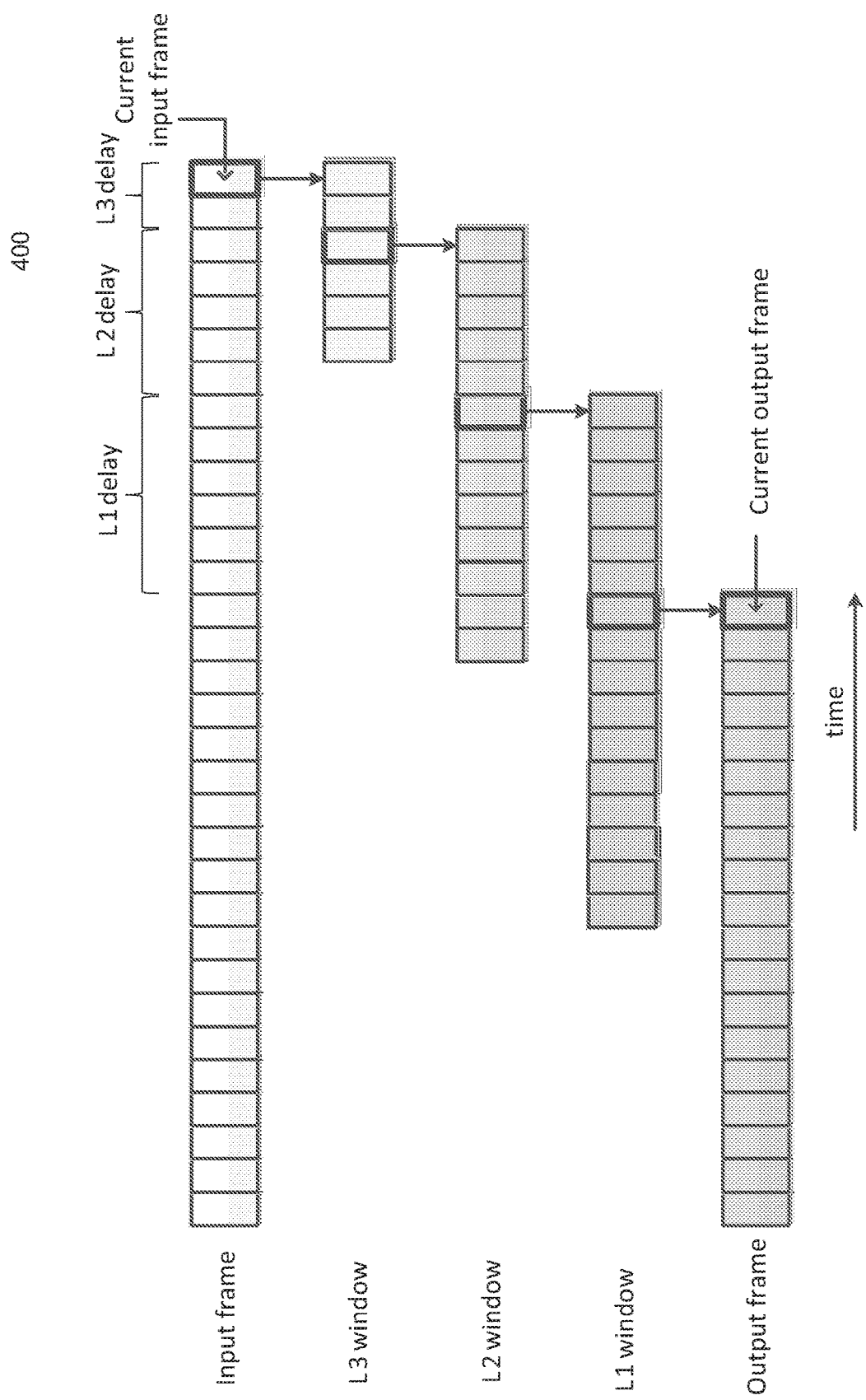
FIG. 4 illustrates an exemplary architecture for a three level sliding window framework for linear encoding according to an embodiment.

FIG. 4 illustrates an exemplary architecture for a three level sliding window framework for linear encoding according to an embodiment. Architecture 400 can be used by both "with HDR reference" and "without HDR reference" modes. In some embodiments, architecture 400 includes one or more levels of sliding window structures, such as, L1, L2, and L3 windows as shown in FIG. 4. The sliding window structures can be implemented by a ring buffer (or queue) data storage to store frame-level statistics for SDR/HDR input frames (or images). In one embodiment, when new data is inserted in any memory buffers of the sliding window, an oldest data in the memory buffer of the sliding window is replaced. Data of each of the sliding windows can be passed to the next level of sliding windows to compute statistical data for the next level of sliding windows. For example, referring to FIG. 4, architecture 400 includes L1, L2, and L3 windows. When architecture 400 receives a new input frame at time t (e.g., current input frame), L3 frame-level statistics are computed for the frame at time $t-t_3$, where $t_3$ denotes a delay associated with the L3 window, using a sliding window operation, such as an averaging operation or a weighted linear/non-linear operation. The output would be used as a statistical data (e.g., input to L2 window) at time $t-t_3$ for L2 window.

The output from L3 window is inserted into the L2 window. L2 frame-level statistics at time $t-t_2-t_3$, where $t_2$ denotes a delay associated with the L2 window, are computed based the inserted L3 output data. The output of the L2 window would be used as a statistical data (e.g., input to L1 window) at time $t-t_2-t_3$ for the L1 window.

The output from L2 window is inserted into the L1 window. L1 frame-level statistics at time $t-t_1-t_2-t_3$, where $t_1$ denotes a delay associated with the L1 window, are computed based the inserted L2 window data. The output would be used as a representative statistical data (e.g., final output data) at time $t-t_1-t_2-t_3$. The output data would have a total latency delay of $t_1+t_2+t_3$ based on this three-level window architecture. As described above, L1, L2, and L3 windows can be ring buffers such that when new data is inserted into any of the windows, an oldest data from the window are replaced or retired. In this way, each of the buffers, stores over time, statistical data for successive portions of an input video stream, and provides an output, based on the successive portions, to a next buffer, to generate final output data at some time later.

Figure 5A:
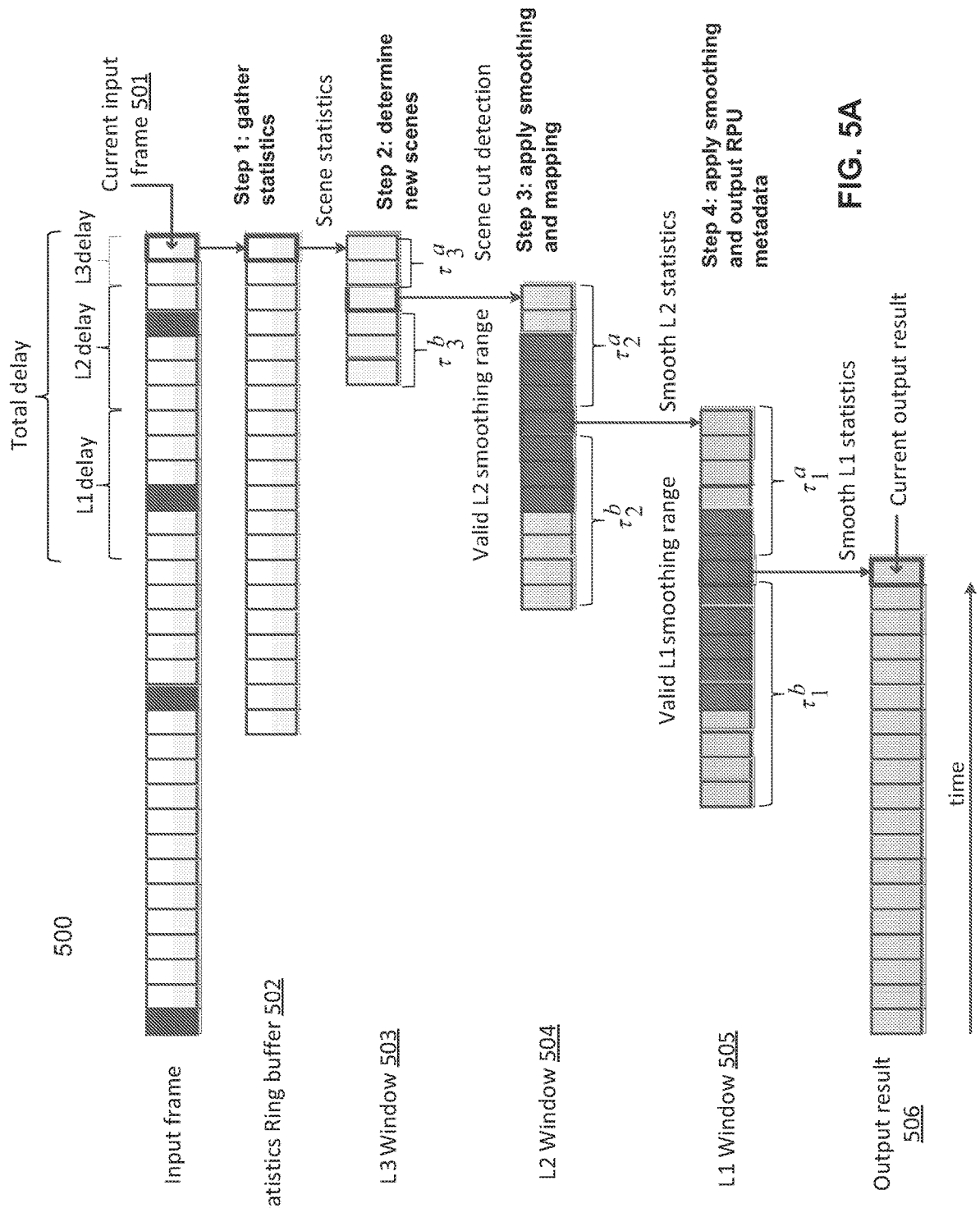
FIGS. 5A-5B illustrates example processes for a three level sliding window framework of FIG. 4 according to some embodiments.

FIG. 5A illustrates an example process for a three-level sliding window framework of FIG. 4 according to an embodiment. Process 500 can be performed by a linear encoder such as encoder 303 of FIG. 3. Process 500 or processing logic can generate, on-the-fly, RPU (composer and DM) metadata from SDR frames, with or without HDR reference in a one-frame-in one-frame-out fashion. In one embodiment, processing logic includes four steps for frame processing. In step 1, processing logic gathers statistics of a current input frame 501, at time t, in the statistics ring buffer 502. Statistics ring buffer 502 can store statistical data for a list of prior frames. In step 2, processing logic determines a scene cut data that identifies if a first frame, a frame at time=t–$\tau_3^a$, includes a new scene using the stored statistical data. Processing logic can determine the scene cut data using L3 window 503. L3 window 503 can correspond to the first frame at time=t–$\tau_3^a$, $\tau_3^a$ frames as "look-ahead" frames, and $\tau_3^b$ frames as "look-back" frame. The scene cut data can be used by subsequent windows, such as L2 and L1 windows, for further frame processing.

In step 3, processing logic performs a CDF matching operation to generate a BLUT for the luma channel for a second frame (a frame at time=t–$\tau_3^a$–$\tau_2^a$. Additionally, a smoothing operation is performed on the generated BLUT corresponding to the second frame (a frame at time=t–$\tau_3^a$–$\tau_2^a$) using L2 window 504. L2 window 504 can correspond to the second frame (time=t–$\tau_3^a$–$\tau_2^a$), $\tau_2^a$ frames as "look-ahead" frames, and $\tau_2^b$ frames as "look-back" frame. Processing logic performs the smoothing operation on the generated BLUT for a L2 smoothing range (e.g., a subset of the frames corresponding to the L2 window) before the generated BLUT is used as a statistical data (e.g., input to L1 window) for the L1 window In step 4, processing logic can perform a smoothing operation on a previously generated BLUT corresponding to a third frame (time=t–$\tau_3^a$–$\tau_2^a$–$\tau_1^a$) using L1 window (505). L1 window (505) can correspond to the third frame (time=t–$\tau_3^a$–$\tau_2^a$–$\tau_1^a$) $\tau_1^a$ frames as "look-ahead" frames, and $\tau_1^b$ frames as "look-back" frames. Processing logic can perform the smoothing operation on the previously generated BLUT for a L1 smoothing range (e.g., a subset of the frames corresponding to the L1 window) prior to converting the smoothed BLUT to approximate piecewise polynomials. Additionally, processing logic solves the MMR coefficients to map chroma components of the third frame (time=t–$\tau_3^a$–$\tau_2^a$–$\tau_1^a$) from SDR to HDR. The MMR coefficients for the chroma channels along with the smoothed BLUT for the luma channel (which is converted to piecewise polynomials) are then used together to generate a current output result, e.g., an output result in output RPU metadata (506) corresponding to the third frame (time=t–$\tau_3^a$–$\tau_2^a$–$\tau_1^a$).

Figure 5B:
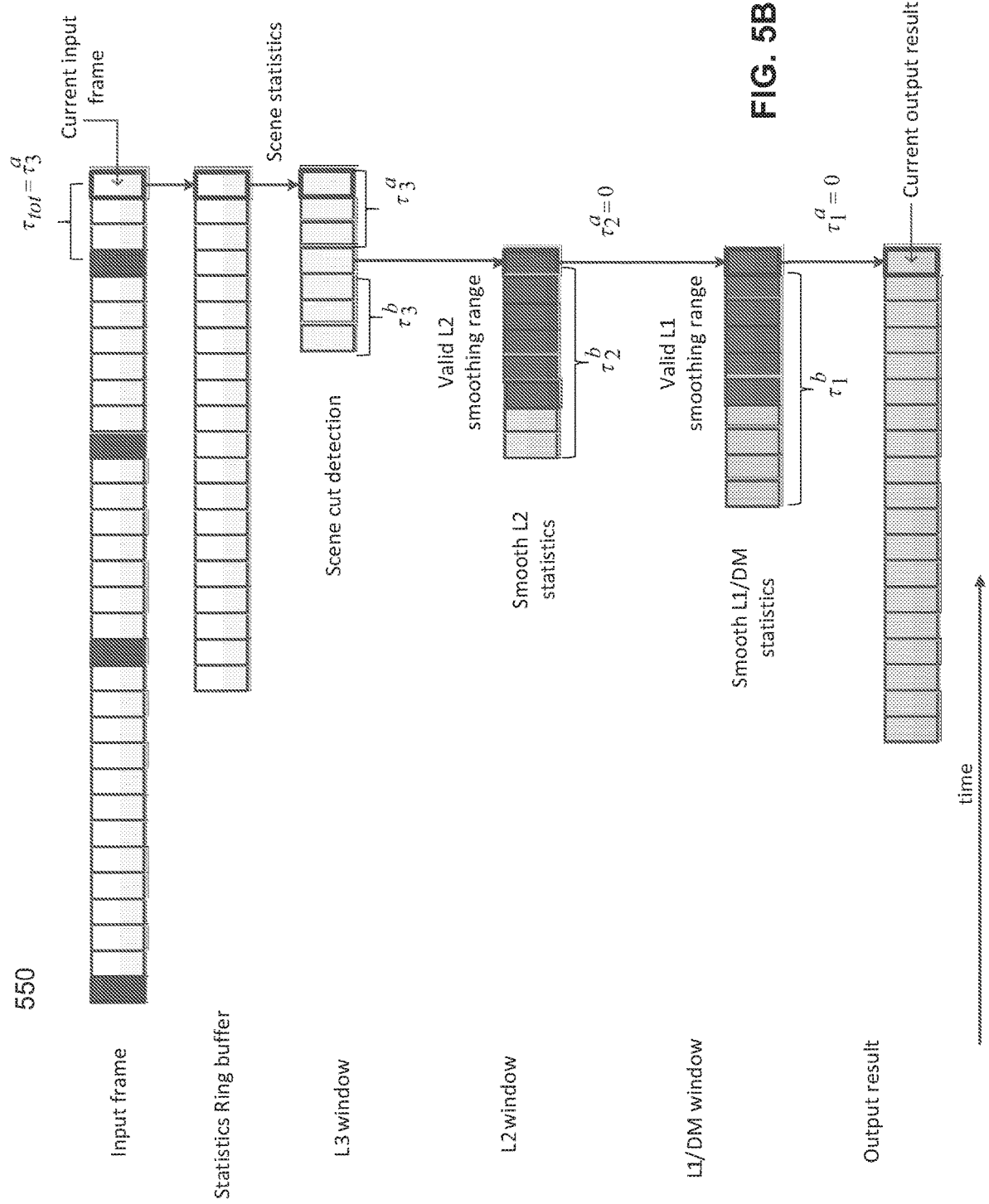

As described above, each level of operation includes a sliding window which uses statistical data from a range of frames to generate an intermediate output for the next level. For example, L3 sliding window can use statistical data for a first frame and its neighboring frames to generate an output for the subsequent L2 sliding window. L2 sliding window can use statistical data from a second frame and its neighboring frames to generate an output for the subsequent L1 sliding window. L1 sliding window can use statistical data from a third frame and its neighboring frames to generate output RPU metadata. At any instance in time, processing logic can receive a current input frame while simultaneous generating RPU metadata for a previously stored frame. The RPU metadata for the current input frame would then be processed in subsequent processing cycles. In this way, input frames can be processed on a one-input one-output fashion. However, there is a constant delay (equal to the total number of "look-ahead" frames from each of the levels) for processing a current input frame since some future frames are required to be processed before generating the output RPU metadata for the current input frame. FIG. 5B illustrates an example process for a three-level sliding window framework of FIG. 4 according to an embodiment. Referring to FIG. 5B, process 550 has a total delay corresponding to a delay for "look-ahead" frames for the L1, L2, and L3 sliding windows. That is, delay is introduced only by the "look-ahead" frames, since these future frames need to be processed before generating metadata for the current frame.

Figure 6:
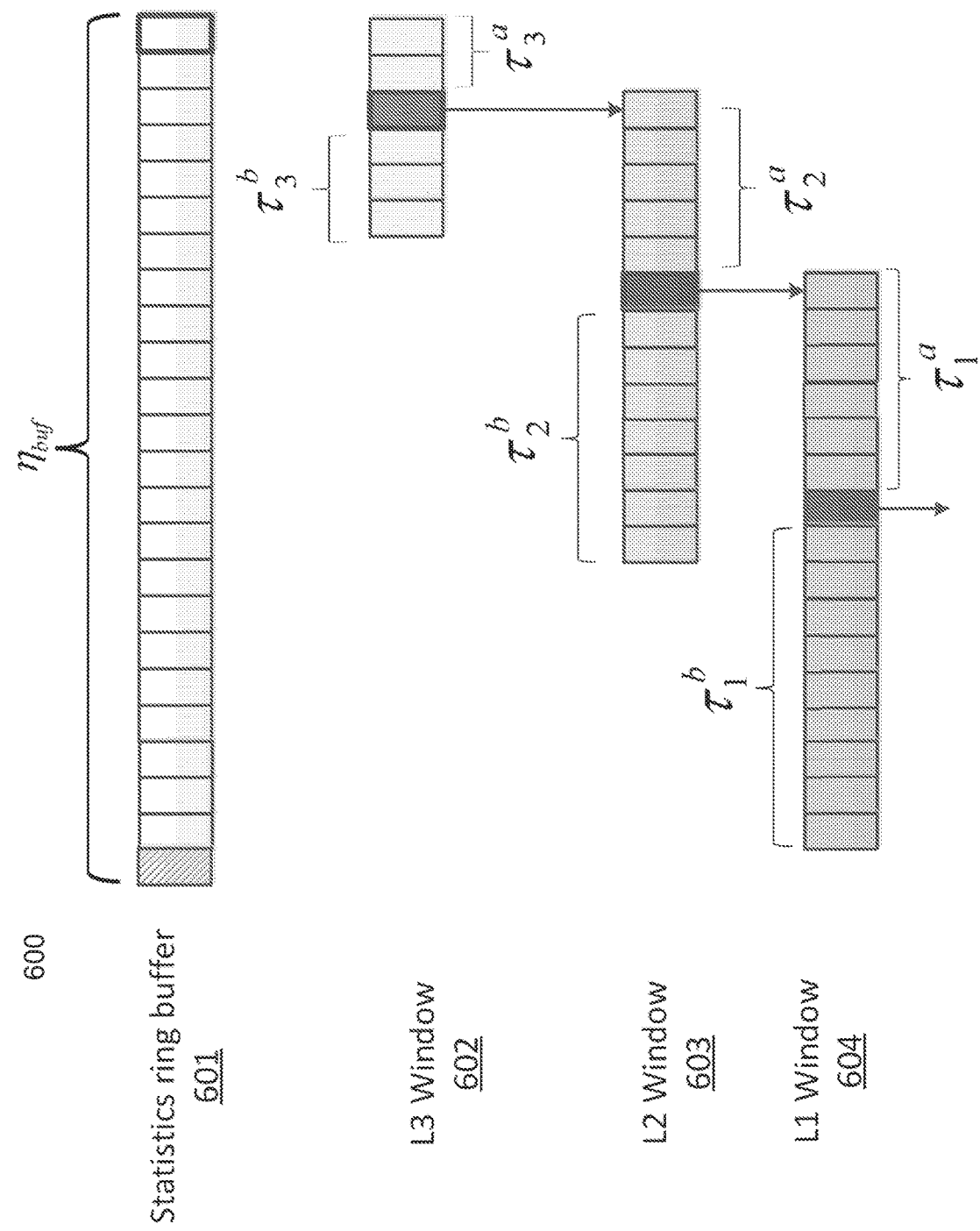
FIG. 6 illustrates an example ring buffer structure for the three level sliding window framework of FIGS. 5A-5B according to an embodiment.

FIG. 6 illustrates exemplary ring buffer structures for the three-level sliding window framework of FIG. 5A according to an embodiment. Ring buffer structures 600 can include statistical window 601 and the three levels of L3, L2, and L1 sliding windows 602-604, as described above, to hold on-the-fly statistics for a sequence of input frames. In some embodiments, the windows are ring memory buffers. These buffers can have a constant size such that the memory allocated to older frame data is reused or data is replaced after each processing cycle. The buffers are conceptually similar to a first-in-first-out (FIFO) queue and can be designed to update in a ring fashion such that new statistics replace the oldest statistics in the buffers. However, the buffer lengths need to be predetermined to avoid buffer overflow.

For L3, L2, and L1 windows 602-604, their ring buffer lengths (or sizes) can be the difference between the two end points of each window. The minimum buffer lengths for L3, L2, and L1 windows 602-604 can be predetermined based on a smoothing range requirement and/or minimum length frame requirements for scene detections.

The minimum length (or size) of the statistical window (or statistical ring buffer) (denoted by $\downarrow_{buf}$) 601 can be calculated as a function of a number of look-ahead and look-back frames of each windows, e.g., $\eta_{buf}=f(\tau_q^p)$, where $p \in \{a, b\}$ and $q \in \{1,2,3\}$ denotes look-back and look-ahead lengths for the L1, L2, and L3 windows, respectively. Referring to FIG. 6, in one embodiment, the minimum length for statistics ring buffer 601 is:

$$\eta_{buf}=1+(1+\tau_3^a+\max(\tau_3^b,\tau_2^a+\max(\tau_2^b,(\tau_1^a+\tau_1^b)))).$$

Here, one additional space is allocated to the ring buffer length to store cumulative sums of some of the statistics. In addition, since these data are stored in a ring fashion i.e. by replacing the oldest value with the new value, modulo math can be used to determine position of a particular frame statistic in the statistical ring buffer or sliding window ring buffers. In some embodiments, statistical ring buffer 601 and L3, L2, and L1 window ring buffers 602-604 can be circular lists, collections, class objects, and/or wrap-around counters.

Figure 7:
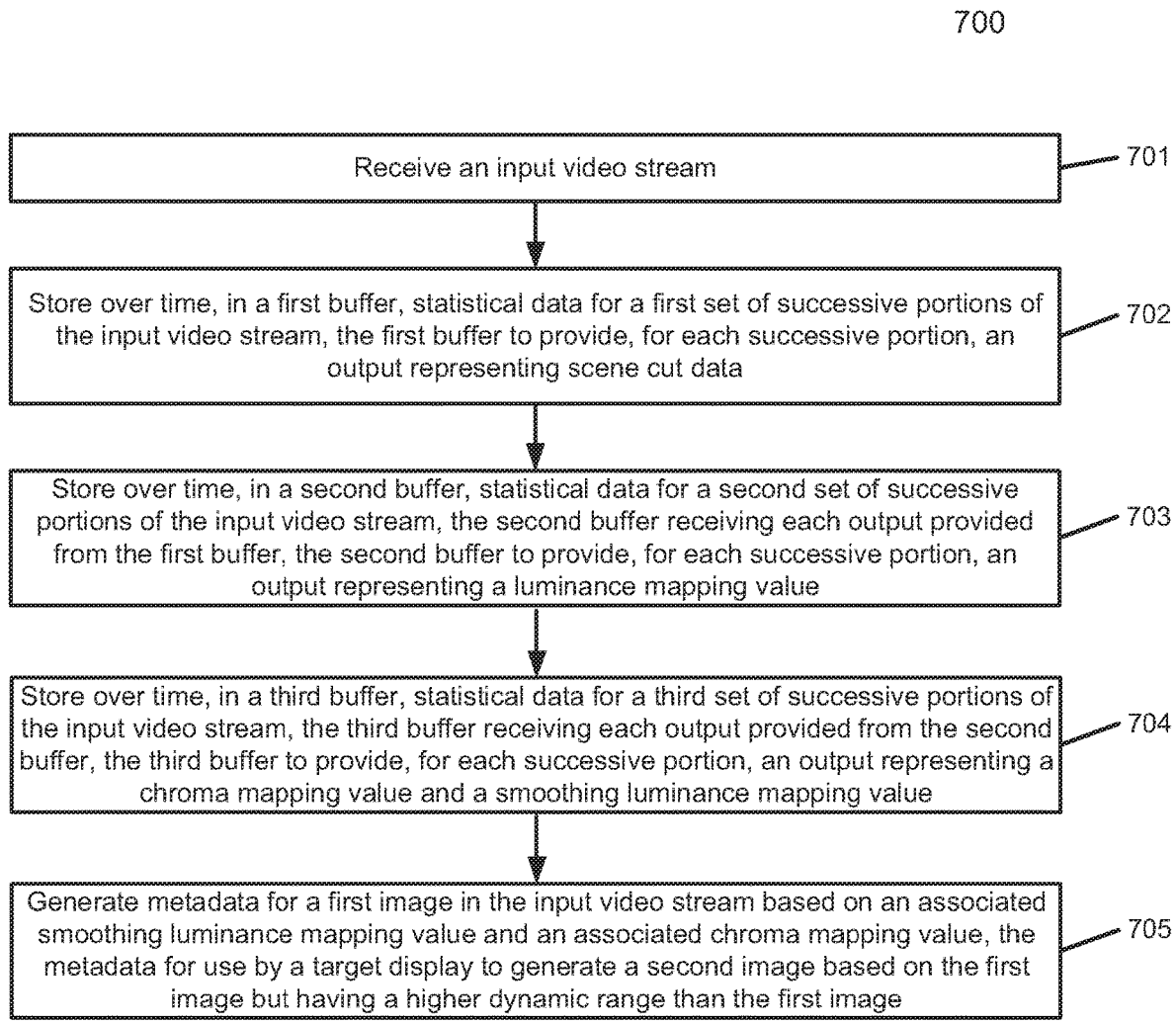
FIG. 7 is a flowchart that shows a method according to one or more embodiments.

FIG. 7 is a flowchart which illustrates a method according to one or more embodiments. Method or process 700 may be performed by processing logic which may include software, hardware, or a combination thereof. For example, process 700 may be performed by encoder 303 of FIG. 3. Referring to FIG. 7, at block 701, processing logic receives an input video stream. At block 702, processing logic stores over time, in a first buffer, statistical data for a first set of successive portions of the input video stream, the first buffer to provide, for each successive portion, an output representing scene cut data. At block 703, processing logic stores over time, in a second buffer, statistical data for a second set of successive portions of the input video stream, the second buffer receiving each output provided from the first buffer, the second buffer to provide, for each successive portion, an output representing a luminance mapping value. At block 704, processing logic stores over time, in a third buffer, statistical data for a third set of successive portions of the input video stream, the third buffer receiving each output provided from the second buffer, the third buffer to provide, for each successive portion, an output representing a chroma mapping value and a smoothing luminance mapping value. At block 705, processing logic generates metadata for a first image in the input video stream based on an associated smoothing luminance mapping value and an associated chroma mapping value, the metadata for use by a target display to generate a second image based on the first image but having a higher dynamic range than the first image. In some embodiments, a non-transitory, machine-readable medium stores instructions which when executed by a display management system cause the system to perform a method as in method 700. In some embodiments, a display management system which includes a memory and a processing system, is configured to perform a method as in method 700.

With Reference EDR

Figure 8:
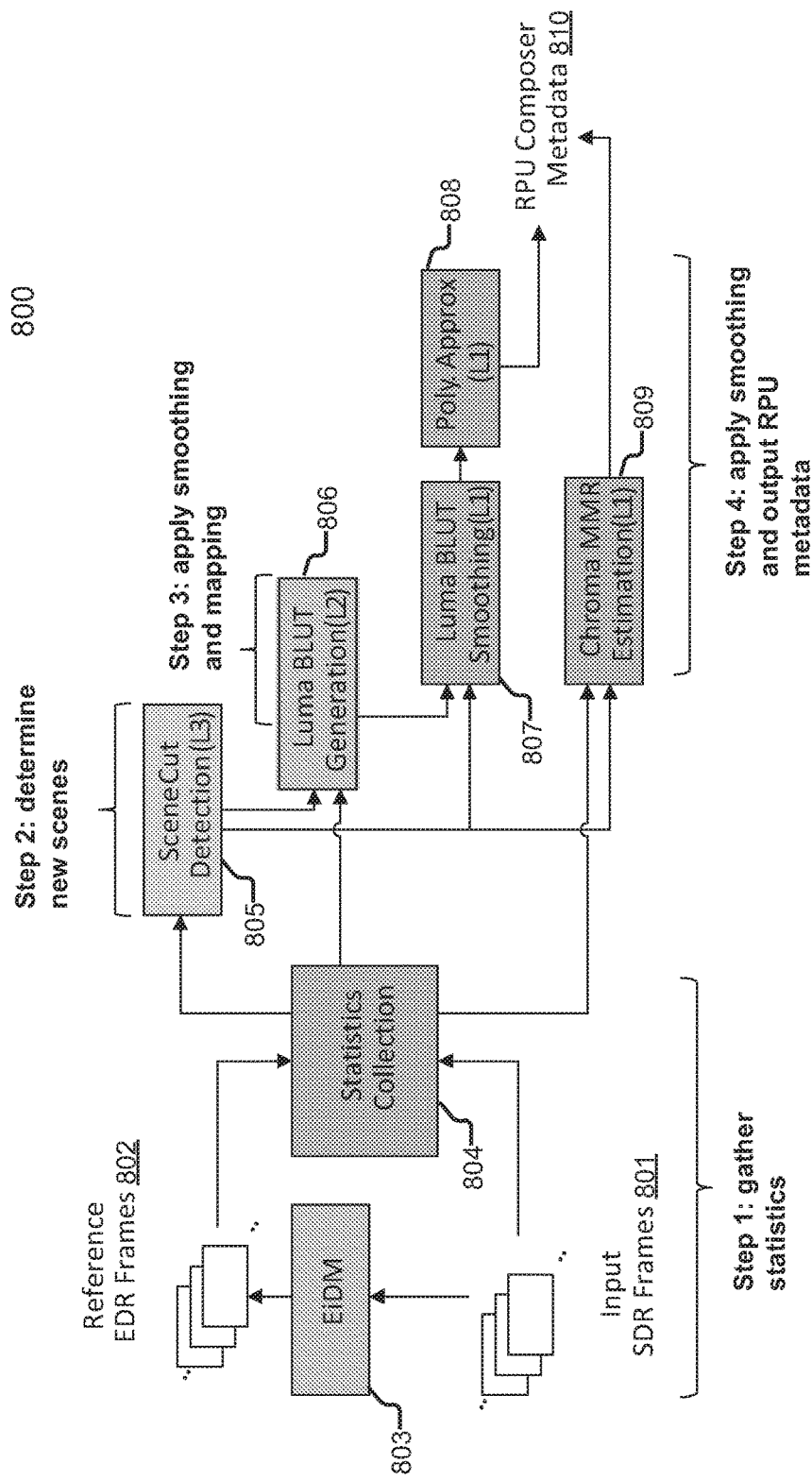
FIG. 8 illustrates a block diagram for an exemplary encoder with reference EDR according to an embodiment.

FIG. 8 illustrates a block diagram for an exemplary encoder with reference EDR according to an embodiment. Encoder 800 can be an encoder such as encoder 303 of FIG. 3. Encoder 800 can generate, on-the-fly, RPU (composer and DM) metadata from SDR frames of a video stream, with HDR reference in a one-frame-in one-frame-out fashion. In one embodiment, encoder 800 includes modules such as EiDM 803, statistics collection 804, scene cut detection (L3) 805, luma BLUT generation (L2) 806, luma BLUT smoothing (L1) 807, polynomial approximation (L1) 808, and chroma MMR estimation (L1) 809. EiDM 803 can generate on-the-fly HDR reference frames 802 using SDR input frame 801. Statistics collection 804 can gather statistics about the SDR and HDR frames 801-802. Scene cut detection (L3) 805 can determine a scene cut data that identifies a new scene in the input SDR frames. Luma BLUT generation (L2) 806 can generate a luma reshaping function to map a luma component of input SDR frames to HDR frames. Luma BLUT smoothing (L1) 807 can apply a smoothing algorithm to the generated luma reshaping function. Polynomial Approximation (L1) 808 can approximate luma reshaping functions into polynomial functions so luma reshaping functions can be reduced to polynomial coefficients to reduce data storage and/or data transmission. Chroma MMR estimation (L1) 809 can generate a chroma reshaping function to map chroma components of input SDR frames to HDR frames. The luma and chroma reshaping functions can be used to generate output RPU metadata 810.

In some embodiments, encoder 800 generates output RPU metadata 810 in four steps. Each step can use one or more sliding windows, such as a statistics window (502), L3, L2, and L1 sliding windows (503, 504, and 505) of FIG. 5, to produce intermediary outputs for a next sliding window.

Let $f_t^S$ be the SDR frame and $f_t^V$ be its iDM reference HDR frame at time=t. Let $s_{t,i}^y$, $s_{t,i}^{c0}$, and $s_{t,i}^{c1}$ be the $i^{th}$ pixel value of Y, Cb and Cr channels respectively for $f_t^S$. Let $v_{t,i}^y$, $v_{t,i}^{c0}$, and $v_{t,i}^{c1}$ be the $i^{th}$ pixel value of Y, Cb and Cr channels respectively for $f_t^V$. At step one, reference EiDM 803 generates reference EDR frames 802 on-the-fly. In one embodiment, EiDM 803 is an external inverse DM (EiDM) module. In one embodiment, reference EDR frames 802 are pre-generated for each input SDR frame. With reference to an input SDR frame (as part of SDR frames 801) at time=t, statistics collection 804 collects or gathers statistics for the input SDR frame and its corresponding reference EDR frame (as part of reference EDR frames 802) and stores these statistics in a statistics ring buffer, such as statistics ring buffer 502 of FIG. 5A. Statistics collection 804 gathers statistics including, but not limited to, scene cut statistics, luma minimum and maximum statistics, luma histogram statistics, and chroma MMR statistics for the input SDR frame and/or reference HDR. Scene cut statistics detect new scenes in the SDR frame of a video stream. The luma minimum and maximum statistics, and luma histogram statistics are used to estimate and generate luma reshaping functions. The chroma MMR statistics are used to estimate and generate chroma reshaping functions.

The luma histogram statistics includes luma histograms as inputs for cumulative distribution function (CDF) matching algorithms to generate a luma reshaping function, which is described in U.S. Provisional Application No. 62/404,307, entitled "Inverse Luma-Chroma Mappings with Histogram Transfer and Approximation," filed on Oct. 5, 2016, which is incorporated herein by reference in its entirety, and PCT Application No. PCT/US2018/013904, entitled "Segment-Based Reshaping for Coding High Dynamic Range Video," filed on Jan. 16, 2018, which is incorporated herein by reference in its entirety. The CDF matching algorithm may be performed in a subsequent step to generate a luma reshaping function.

In one embodiment, to reduce a computational load, statistics collection 804 can divide SDR codewords of an input SDR frame into M non-overlapping bins (e.g., M=16, 32, or 64) with equal intervals $w_b$ (e.g., for 16-bit input data, $w_b$=65,536/M) to cover a normalized dynamic range (e.g., (0,1]). Denote the number of bins in SDR and EDR as $M^s$ and $M^v$ respectively, and denote the corresponding bin intervals as $w_{bS}$ and $w_{bV}$, respectively. In another embodiment, to reduce the computational load further, the SDR/HDR histograms are stored in a cumulative fashion (e.g., $h_{t,b}^{C,s}$, $h_{t,b}^{C,v}$), such that each bin is initialized to the value of its corresponding bin from a previous time frame or processing cycle. Note, the superscript "C" indicates a cumulative sum. Table 1 below illustrates the collection of cumulative luma histogram statistics.

TABLE 1

// STEP 1: histogram initialization as cumulative sum
$h_{t,b}^{C,s} = h_{t-1,b}^{C,s}$ for b = 0, ..., $M^s$ − 1 (For t = −1, all $h_{t,b}^s$ = 0)
$h_{t,b}^{C,v} = h_{t-1,b}^{C,v}$ for b = 0, ..., $M^v$ − 1 (For t = −1, all $h_{t,b}^v$ = 0)
// STEP 2: scan for each pixel in SDR to build PDF
for (i = 0; i < P; i++){

$$b^S = \left\lfloor \frac{s_{t,i}^y}{w_{bS}} \right\rfloor$$

$$b^V = \left\lfloor \frac{v_{t,i}^y}{w_{bV}} \right\rfloor$$

$h_{t,b^S}^{C,s}$ ++;    // histogram for SDR
$h_{t,b^V}^{C,v}$ ++;    // histogram for iDM HDR
}

In one embodiment, statistics collection 804 can gather chroma MMR statistics for MMR polynomials for generation of reshaping functions for chroma channels. Let the pixel values from $f_t^S$ be denoted as $$s_{t,i} = \begin{bmatrix} s_{t,i}^y \\ s_{t,i}^{c0} \\ s_{t,i}^{c1} \end{bmatrix}.$$

In one embodiment, the MMR polynomial is a second order MMR polynomial. In another embodiment, the MMR polynomial is a third order MMR polynomial. For example, a second order MMR polynomial (e.g., $\bar{s}_{t,i}$) can be constructed based on $s_{t,i}$ as:

$$\bar{s}_{t,i}^T = [1 \; s_{t,i}^{y,d} s_{t,i}^{c0} s_{t,i}^{c1} \ldots s_{t,i}^{y,d} s_{t,i}^{c0} \ldots (s_{t,i}^{y,d} s_{t,i}^{c0})^2 \ldots (s_{t,i}^{c0})^2 (s_{t,i}^{c1})^2 \ldots ],$$

where $s_{t,i}^{y,d}$ is the $i^{th}$ pixel value of the down-sampled Y component for $f_t^S$ having $P_C$ number of pixels.

Let the iDM chroma values and predicted chroma values using backward MMR be $$v_{t,i} = \begin{bmatrix} v_{t,i}^{c_0} \\ v_{t,i}^{c_1} \end{bmatrix} \text{ and } \hat{v}_{t,i} = \begin{bmatrix} \hat{v}_{t,i}^{c_0} \\ \hat{v}_{t,i}^{c_1} \end{bmatrix},$$

respectively, where $c_0$ and $c_1$ are two chroma channels. In one embodiment, input frame pixels or image pixels are down-sampled to reduce a computational load. For example, instead of using all pixels for an input frame to form MMR matrices for MMR estimation algorithm, each $r_{ds}$'th pixel is used as a representative pixel for the input frame, where $r_{ds}$ denotes the down-sampling ratio. Recall that $P_C$ is the number of chroma pixels in the image. Thus, the MMR matrix dimensions are reduced from $P_C$ to $P_{ds}$, where $$P_{ds} = \left\lceil \frac{P_C}{r_{ds}} \right\rceil.$$

Predicted chroma, iDM chroma, and MMR matrices for an image with $P_C$ chroma pixels reduced to $P_{ds}$ pixels can then be expressed as:

$$\hat{V}_t = \begin{bmatrix} \hat{v}_{t,0}^T \\ \hat{v}_{t,r_{ds}}^T \\ \vdots \\ \hat{v}_{t,(P_{ds}-1) \cdot r_{ds}}^T \end{bmatrix}, V_t = \begin{bmatrix} v_{t,0}^T \\ v_{t,r_{ds}}^T \\ \vdots \\ v_{t,(P_{ds}-1) \cdot r_{ds}}^T \end{bmatrix},$$

and $\overline{S}_t = \begin{bmatrix} \overline{s}_{t,0}^T \\ \overline{s}_{t,r_{ds}}^T \\ \vdots \\ \overline{s}_{t,(P_{ds}-1) \cdot r_{ds}}^T \end{bmatrix}$, respectively.

An MMR backward reshaping matrix (e.g., M) is used to predict chroma value, $\hat{v}_{t,i}$ closest to reference chroma value $v_{t,i}$. Let the predicted value be $\hat{V}_t = \overline{S}_t M_t$, where $M_t = (A_t)^{-1}(B_t)$. Thus, statistics for matrices A and B can be collected for the current input frame, where $A_t = \overline{S}_t^T \overline{S}_t$ and $B_t = \overline{S}_t^T V_t$, to generate a chroma backward reshaping function.

In one embodiment, to reduce a computational load, matrices A and B are stored in a cumulative fashion. Table 2 illustrates an example process for chroma statistics collection.

TABLE 2

// Initialize cumulative sum matrices
Define $A_{-1}^C = 0$, $B_{-1}^C = 0$ $$V_t = \begin{bmatrix} v_{t,0}^T \\ v_{t,r_{ds}}^T \\ \vdots \\ v_{t,(P_{ds}-1) \cdot r_{ds}}^T \end{bmatrix}, \text{ and } \overline{S}_t = \begin{bmatrix} \overline{s}_{t,0}^T \\ \overline{s}_{t,r_{ds}}^T \\ \vdots \\ \overline{s}_{t,(P_{ds}-1) \cdot r_{ds}}^T \end{bmatrix}$$

$A_t = \overline{S}_t^T \overline{S}_t$
$B_t = \overline{S}_t^T V_t$
$A_t^C = A_{t-1}^C + A_t$
$B_t^C = B_{t-1}^C + B_t$ In step two of the four step process of FIG. 8, scene-cut detection 805 can determine a new scene cut based on gathered scene cut statistics using a L3 sliding window. For example, scene cut occurrences can be computed using scene cut statistics of frames from L3 (scene-cut detection) window for $f_{t-\tau_3^a}$ (a frame at time=$t-\tau_3^a$). Let $t_{L3}^{(l)}$ and $t_{L3}^{(r)}$ be the time indices of left and right boundaries of a scene cut detection window for $$f_{t-\tau_3^a}^S,$$

where $t_{L3}^{(l)} = \max(t-(\tau_3^a + \tau_3^b), 0)$, and $t_{L3}^{(r)} = t$. Let the left and right frames of the scene cut detection window be $$f_{t_{L3}^{(l)}} \text{ and } f_{t_{L3}^{(r)}},$$

respectively. Note that $$f_{t_{L3}^{(r)}}$$

is the current input frame. Scene-cut detection 805 can then detect a scene cut for a frame at time=$t-\tau_3^a$ using the scene cut statistics corresponding to frames at time=$t_{L3}^{(l)} \leq t \leq t_{L3}^{(r)}$, e.g., a window bounded by frames $$f_{t_{L3}^{(l)}} \text{ and } f_{t_{L3}^{(r)}}.$$

In one embodiment, scene-cut detection 805 outputs a binary scene cut flag, e.g., $$SC_{t-\tau_3^a},$$

indicating whether frame at time=$t-\tau_3^a$ includes a new scene or not. In one embodiment, the scene-cut data is stored in a ring buffer to be subsequently used as inputs for (L2 and L1) windows.

In step three of the four step process of FIG. 8, luma BLUT generation 806 generates a backward look up table (BLUT) for a frame at time=$t-\tau_3^a-\tau_2^a$ by applying CDF matching on histogram statistics corresponding to image frames of the L2 window. For example, luma BLUT generation 806 can generate a luma BLUT for $$f_{t-\tau_3^a-\tau_2^a},$$

the frame at $t-\tau_3^a-\tau_2^a$, by applying CDF matching on SDR and HDR histograms corresponding to a L2 sliding window. Luma BLUT generation 806 can first identify scene boundaries for frames corresponding to the L2 window. In this case, if a scene contains only one frame, only that frame is considered in the L2 window. Note that the first and last frames of a video stream are considered to include a scene cut. For example, let $t_{L2}^{(l)}$ and $t_{L2}^{(r)}$ be the time indices of the left and right window boundaries of the L2 sliding window. Let $t_{SC,L2}^{(l)}$ and $t_{SC,L2}^{(r)}$ be the left and right scene boundaries for $$f_{t-\tau_3^a-\tau_2^a}.$$

Thus, $t_{SC,L2}^{(l)} \leq (t-\tau_3^a-\tau_2^a) \leq t_{SC,L2}^{(r)}$, $SC_t = 0$ for $t \in (t_{SC,L2}^{(l)}, t_{SC,L2}^{(r)}]$, $$SC_{t_{SC,L2}^{(l)}} = 1, \text{ and } SC_{t_{SC,L2}^{(r)}+1} = 1.$$

After establishing the scene boundaries, the left and right time boundaries of the L2 window for $f_{t-\tau_3^a-\tau_2^a}$ can be determined as:

$t_{L2}^{(l)} = \max(t-\tau_3^a-(\tau_2^a+\tau_2^b), t_{SC,L2}^{(l)})$ and $t_{L2}^{(r)} = \min(t-\tau_3^a, t_{SC,L2}^{(r)})$, respectively.

Let the left and right end of frames of the L2 window be $f_{t_{L2}^{(l)}}$ and $f_{t_{L2}^{(r)}}$, respectively. Let $c_b^s$ and $c_b^v$ be the b'th bin values of SDR and HDR CDF respectively. Let $\tilde{T}_b$ be the b'th bin value of the temporary BLUT. The output of L2 window is a luma BLUT $\left(\text{e.g., } T_{t-\tau_3^a-\tau_2^a,b}^{L2}\right)$ for $f_{t-\tau_3^a-\tau_2^a}$.

In one embodiment, the luma BLUT is stored as cumulative sums across time domain and denoted by $T_{t-\tau_3^a-\tau_2^a,b}^{C,L2}$.

Step two of the four step process of FIG. 8 can be illustrated in Table 3. Note that a smoothing window size for mid-tone smoothing in Step G of Table 3 can be determined based on the SDR frame bit-depth, for example:

$$W = \begin{cases} 35 & \text{if } s_{bitdepth} = 10 \\ 8 \cdot 2^{(s_{bitdepth}-8)} & \text{otherwise} \end{cases}.$$

TABLE 3

// STEP A: Initialization
$c_b^s = 0$ for $b = -1, \ldots, M^S - 1$
$c_b^v = 0$ for $b = -1, \ldots, M^V - 1$
$T_{-1,b}^{C,L2} = 0$, for all $b = 0 \ldots, M^S - 1$
// STEP B: Find L2 window boundary
$t_{L2}^{(l)} = \max(t - \tau_3^a - (\tau_2^a + \tau_2^b), t_{SC,L2}^{(l)})$
$t_{L2}^{(r)} = \min(t - \tau_3^a, t_{SC,L2}^{(r)})$
// STEP C: Obtain L2 histogram (PDF) using the difference between cumulative sums for (b = 0; b < $M^S$; b++){

$h_{L2,b}^s = h_{t_{L2}^{(r)},b}^{C,s} - h_{(t_{L2}^{(l)}-1),b}^{C,s}$; // histogram for *SDR*

}
for (b = 0; b < $M^V$; b++){

$h_{L2,b}^v = h_{t_{L2}^{(r)},b}^{C,v} - h_{(t_{L2}^{(l)}-1),b}^{C,v}$; // histogram for *iDM*

}
// STEP D: Build CDF using PDF
for(b = 0; b < $M^S$; b++){
  $c_b^s = c_{b-1}^s + h_{L2,b}^s$
}
for(b = 0; b < $M^V$; b++){
  $c_b^v = c_{b-1}^v + h_{L2,b}^v$
}

TABLE 3-continued

// STEP E: Normalize CDF between [0 1]
for(b = 0; b < $M^S$; b ++){

$c_b^s = \dfrac{c_b^s}{P}$

}
for(b = 0; b < $M^V$; b ++){

$c_b^v = \dfrac{c_b^v}{P}$

}
// STEP F: CDF Matching: Histogram transfer
for(b = 0; b < $M^S$; b ++){
  // for each SDR sample point, find the corresponding CDF value
  // find the iDM whose CDF cover the SDR CDF.
  find k such that $c_{k-1}^v \le c_b^s \le c_k^v$
  // find the iDM sample points
  perform interpolation based on $c_{k-1}^v$ and $c_k^v$ $\tilde{T}_b = (k-1) + \dfrac{c_b^s - c_{k-1}^v}{c_k^v - c_{k-1}^v}$ }
// STEP G: CDF Matching: Curve smoothing using varying window size
// lower end for $\left(b = 0; b \le s_{t-\tau_3^a-\tau_2^a}^L; b++\right)${

$T_{t-\tau_3^a-\tau_2^a,b}^{L2} = \tilde{T}_b$

}
// higher end for $\left(b = s_{t-\tau_3^a-\tau_2^a}^H; b \le M^S - 1; b++\right)${

$T_{t-\tau_3^a-\tau_2^a,b}^{L2} = \tilde{T}_b$

}
// mid-tone smoothing for $\left(b = s_{t-\tau_3^a-\tau_2^a}^L + 1; b < s_{t-\tau_3^a-\tau_2^a}^H; b++\right)${

$W_b = \min\left\{b - s_{t-\tau_3^a-\tau_2^a}^L + 2, s_{t-\tau_3^a-\tau_2^a}^H - b + 2, \dfrac{W}{2}\right\}$ $W_b^- = \text{clip3}(b - W_b, 0, M^S - 1)$
$W_b^+ = \text{clip3}(b + W_b, 0, M^S - 1)$ $T_{t-\tau_3^a-\tau_2^a,b}^{L2} = \dfrac{1}{W_b^+ - W_b^- + 1} \sum_{k=W_b^-}^{W_b^+} \tilde{T}_k$ }
// STEP H: CDF Matching: Rounding and clipping $T_{t-\tau_3^a-\tau_2^a,b}^{L2} = \text{clip3}\left(\text{round}\left(T_{t-\tau_3^a-\tau_2^a,b}^{L2}\right), 0, N^V - 1\right);$ // STEP I: Store cumulative sum across time domain
for(b = 0; b < $M^S$; b ++){
  // for each point, add BLUT value to form cumulative sum $T_{t-\tau_3^a-\tau_2^a,b}^{C,L2} = T_{t-\tau_3^a-\tau_2^a-1,b}^{C,L2} + T_{t-\tau_3^a-\tau_2^a,b}^{L2}$

}

As described above, in step three, luma BLUT generation 806 can generate a luma BLUT for $$f_{t-\tau_3^a-\tau_2^a}$$

using the L2 window to map luma component of an input SDR frame to reference HDR frame.

In step four, encoder 800 can perform a smoothing operation on a previously generated luma BLUT for $$f_{t-\tau_3^a-\tau_2^a-\tau_1^a}$$

using a L1 window. Encoder 800 can then approximate a piecewise polynomial, e.g., a luma reshaping function, to reduce storage and/or data transmission. In addition, encoder 800 can generate chroma MMR mapping coefficients for $$f_{t-\tau_3^a-\tau_2^a-\tau_1^a}$$

using the L1 window.

For example, let $t_{L1}^{(l)}$ and $t_{L1}^{(r)}$ denote the time indices of the left and right L1 window boundaries for $$f_{t-\tau_3^a-\tau_2^a-\tau_1^a}.$$

Similar to the L2 Window, in one embodiment, luma BLUT smoothing 807 first detects the boundaries of the scene for frame $$f_{t-\tau_3^a-\tau_2^a-\tau_1^a}$$

within the L1 window, using the scene cut information. Let $t_{SC,L1}^{(l)}$ and $t_{SC,L1}^{(r)}$ be the left and right scene boundaries for $$f_{t-\tau_3^a-\tau_2^a-\tau_1^a}.$$

Let $$SC_{t_{SC,L1}^{(l)}} = 1, SC_{t_{SC,L1}^{(r)}+1} = 1$$

such that $t_{SC,L1}^{(l)} \leq (t-\tau_3^a-\tau_2^a-\tau_1^a) \leq t_{SC,L1}^{(r)}$ and $SC_t=0$ for $t \in (t_{SC,L1}^{(l)}, t_{SC,L1}^{(r)}]$. If the scene contains only one frame, just that frame is considered in the L1 window.

The left and right boundaries of the L1 window for $$f_{t-\tau_3^a-\tau_2^a-\tau_1^a}$$

can then be determined to be $t_{L1}^{(l)}=\max(t-\tau_3^a-\tau_2^a-(\tau_1^a+\tau_1^b), t_{SC,L1}^{(l)})$, and $t_{L1}^{(r)}=\min(t-\tau_3^a-\tau_2^a, t_{SC,L1}^{(r)})$. Thus, the left and right frames of the L1 window are $$f_{t_{L1}^{(l)}} \text{ and } f_{t_{L1}^{(r)}}.$$

Table 4 illustrates a smoothing operation of step four, where $$T^{L1}_{t-\tau_3^a-\tau_2^a-\tau_1^a,b}$$

is the b'th bin of final luma BLUT.

TABLE 4

```
// STEP 1: Find sliding window boundary and obtain average LUT
t_L1^(l) = max(t − τ_3^a − τ_2^a − (τ_1^a + τ_1^b), t_SC,L1^(l))
t_L1^(r) = min(t − τ_3^a − τ_2^a, t_SC,L1^(r))
// STEP 2: Take difference of cumulative sums, equivalent to the sum of window BLUTs
for (b = 0; b < M^S; b ++){
```

$$T^{L1}_{t-\tau_3^a-\tau_2^a-\tau_1^a,b} = T^{C,L2}_{t_{L1}^{(r)},b} - T^{C,L2}_{t_{L1}^{(l)}-1,b} \quad\text{// Sum L2 BLUTs: difference in cumulative sums}$$

```
}
// STEP 3: Normalize summed BLUTs
for(b = 0: b < M^S; b ++)
```

$$T^{L1}_{t-\tau_3^a-\tau_2^a-\tau_1^a,b} = \frac{T^{L1}_{t-\tau_3^a-\tau_2^a-\tau_1^a,b}}{t_{L1}^{(r)} - t_{L1}^{(l)} + 1}$$

```
end
```

In one embodiment, polynomial approximation 808 converts the smoothed luma BLUT to a piecewise polynomial having polynomial coefficients using a curve fitting algorithm. For example, a luma BLUT (e.g., a backward reshaping lookup table for input SDR codewords mapping onto output EDR codewords) is divided into multiple sections and each section is curve fitted to a higher order polynomial (e.g., a piecewise polynomial). The coefficients of the polynomials or the luma mapping function can then be used to generate RPU composer metadata 810.

In one embodiment, chroma MMR estimation 809 solves a least square problem to estimate the MMR coefficient matrix using cumulative sum matrices A and B gathered in step one. MMR estimation method relies on minimizing the "overall" error between chroma component of a predicted HDR frame and chroma components of a reference HDR frame. Table 5 illustrates the generation of MMR matrix coefficients, where $$M^{L1}_{t-\tau_3^a-\tau_2^a-\tau_1^a}$$

is the MMR coefficient matrix for $$f_{t-\tau_3^a-\tau_2^a-\tau_1^a}.$$

TABLE 5

// STEP 1: Sum up statistics $$A = A^{C}_{t^{r}_{L1}} - A^{C}_{t^{(l)}_{L1}-1}$$

$$B = B^{C}_{t^{r}_{L1}} - B^{C}_{t^{(l)}_{L1}-1}$$

// STEP 2: Solve the least square problem to get MMR coefficients $$M^{L1}_{t-\tau_3^a-\tau_2^a-\tau_1^a} = (A)^{-1}(B)$$

Once the MMR matrix coefficients are solved, encoder 800 then inserts the solved MMR matrix coefficients (e.g., chroma channels) along with the approximated luma piecewise polynomial coefficients (e.g., luma channel) into RPU metadata 810, where RPU metadata 810 corresponds to frame, $f_{t-\tau_{tot}}$, where $\tau_{tot}=\tau_3^a+\tau_2^a+\tau_1^a$.

As described above, the four steps of encoder 800 can generate, on-the-fly, RPU metadata from SDR frames with HDR reference in a one-frame-in one-frame-out fashion. In one embodiment, in step one, processing logic gathers statistics of a current input frame (501), at time t, in the statistics ring buffer (502). Statistics ring buffer (502) stores statistical data for a list of prior frames. In step two, processing logic determines a scene cut data that identifies if a first frame at time=$t-\tau_3^a$ includes a new scene using the stored statistical data, where $\tau_3^a$ denotes a delay associated with L3 window (503). L3 window (503) can correspond to the first frame associated with a first time delay. The scene cut data (e.g., output of L3 window) can be used by subsequent windows, such as L2 and L1 windows, for further frame processing. In step three, L2 sliding window can use statistical data from multiple neighboring frames of a second frame associated with a second time delay and scene cut data from the L3 window to generate an output for subsequent L1 sliding windows. In step four, L1 sliding window can use statistical data from multiple neighboring frames of a third frame associated with a third time delay to generate an output RPU metadata.

Figure 9:
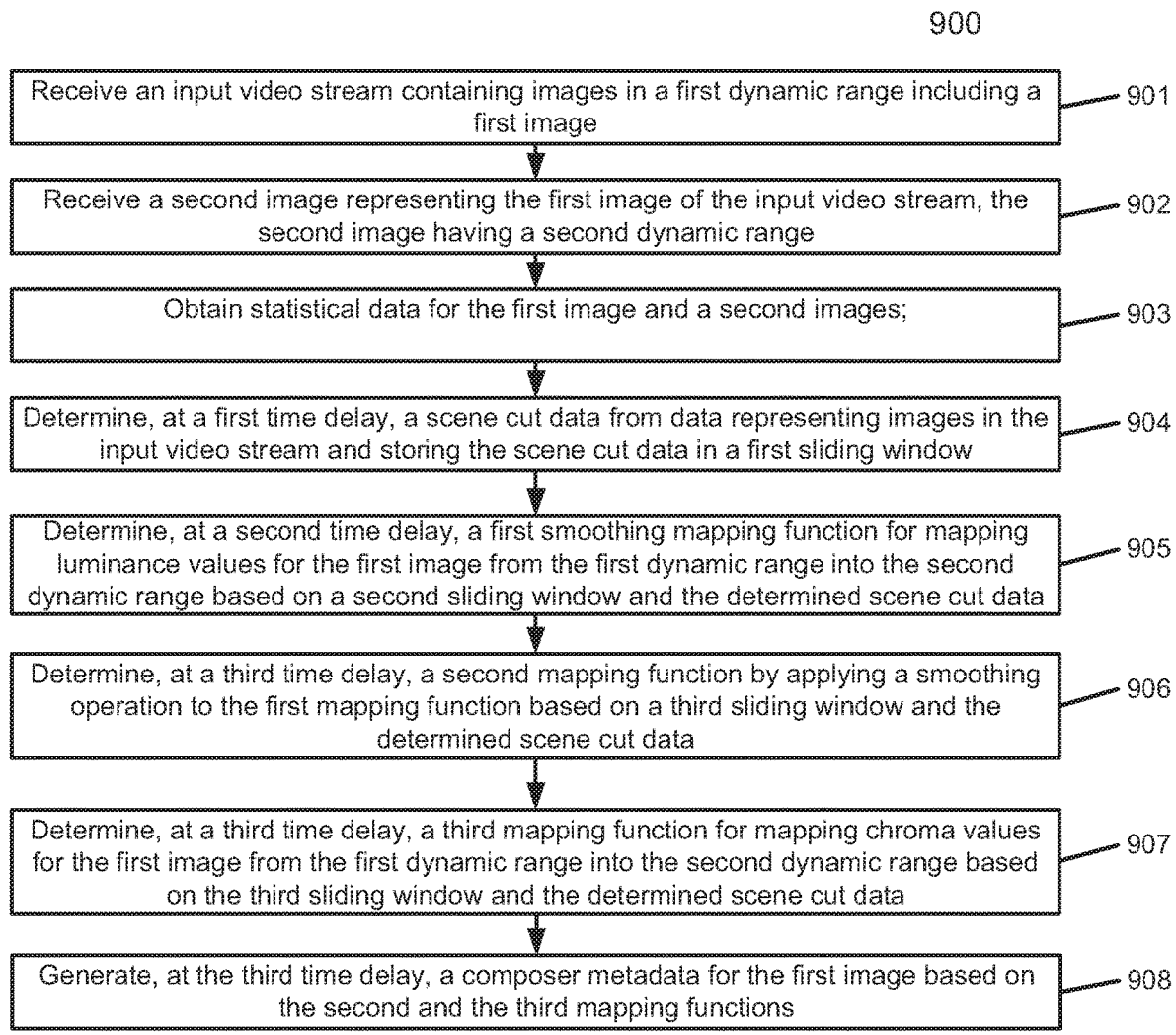
FIG. 9 is a flowchart that shows a method according to one or more embodiments.

FIG. 9 is a flowchart that shows a method for luma and/or chroma reshaping according to one or more embodiments. Method or process 900 may be performed by processing logic which may include software, hardware, or a combination thereof. For example, process 900 may be performed by encoder 303 of FIG. 3. Referring to FIG. 9, at block 901, processing logic receives an input video stream containing images in a first dynamic range including a first image. At block 902, processing logic receives a second image representing the first image of the input video stream, the second image having a second dynamic range which is higher than the first dynamic range. At block 903, processing logic obtains statistical data for the first and the second images. The statistical data include scene cut statistics, luma statistics, and chroma statistics. The statistical data is used by one or more sliding windows to generate a scene cut data identifying new scenes, luma component mapping functions, and chroma component mapping functions. At block 904, processing logic determines, at a first time delay, a scene cut data from data representing images in the input video stream and stores the scene cut data in a first sliding window, the scene cut data determined based on the statistical data of the first image, the statistical data of one or more look ahead images after the first image in time in the input video stream, and the statistical data of one or more look back images before the first image in time in the input video stream. At block 905, processing logic determines, at a second time delay, a first mapping function for mapping luminance values for the first image from the first dynamic range into the second dynamic range based on a second sliding window and the determined scene cut data. At block 906, processing logic determines, at a third time delay, a second mapping function by applying a smoothing operation to the first mapping function based on a third sliding window and the determined scene cut data. At block 907, processing logic determines, at a third time delay, a third mapping function for mapping chroma values for the first image from the first dynamic range into the second dynamic range based on the third sliding window and the determined scene cut data. At block 908, processing logic generates, at the third time delay, a composer metadata for the first image based on the second and the third mapping functions, wherein the generated composer metadata are used by a target display device to map the first image from the first dynamic range into the second dynamic range for display.

Reshaping Using a 3D Flattened Mapping Table (3D-FMT) for Color Artifacts

The previously MMR approximation method can be described as a pixel-based method because equal weights are given to each pixel for an MMR optimization process. Since the described MMR optimization process relies on minimizing an "overall" error between chroma components of a predicted HDR frame and chroma components of a reference HDR frame, for a small number of pixels (e.g., minority pixels), even if the individual error is higher, their cumulative effect can be small in comparison with an "overall" error. In a few cases, color artifacts such as red color patches and green/pink coloring appears in the predicted HDR frame due to the minority pixels of the input SDR frame. In some examples, minority pixels in comparison with the total pixels of an image can be about 0.05%. To avoid these color artifacts, a codeword bin-based method (e.g., a 3D flattened mapping table (3D-FMT) method) can be used to approximate the MMR coefficient matrix for mapping the SDR to HDR images.

In some embodiments, each entry of $\overline{S}_t$ matrix (the previously pixel-based method included pixel values as the $\overline{S}_t$ matrix) includes a codeword bin of a 3D SDR histogram. Each entry or bin is given an equal weight as the rest of the entries. The 3D SDR histogram corresponds to a 3D mapping table. Essentially, during step one of gathering statistics as described previously, the computation of matrices A and B is modified as below to reduce the color artifacts.

MMR Matrix A and B Computation Using 3D-FMT for Color Artifacts

In some embodiments, the SDR image are quantized to three channel values (Y, $C_0$ and $C_1$) using a fixed number of bins $Q_y$, $Q_{C_0}$, $Q_{C_1}$ for each of the three luma and chroma components. Note that a down-sampled luma signal ($s_{t,i}^{y,d}$) is used to match the dimensions with that of 4:2:0 chroma channels. The quantized SDR image is used to compute a 3D histogram ($Q_y \times Q_{C_0} \times Q_{C_1}$) corresponding to a 3D mapping table.

Let the bins of a 3D histogram for frame $f_t^S$ be denoted as $\Omega_t^{Q,s}$, where $Q=[Q_y, Q_{C_0}, Q_{C_1}]$ and $\Omega_t^{Q,s}$ contains ($Q_y.Q_{C_0}.Q_{C_1}$) total number of bins in three dimensions (3D). Each 3D bin can be specified by bin index $q=(q_y, q_{C_0}, q_{C_1})$ representing a number of pixels having those 3-channel quantized values.

The EDR chroma sums in each SDR 3D bin are also computed. Let $\Psi_{t,C_0}^{Q,v}$ and $\Psi_{t,C_1}^{Q,v}$ be the mapped EDR chroma values such that each bin contains the sum of the EDR chroma (e.g., $C_0$ and $C_1$) pixel values with codewords belonging to that bin. Table 6 below illustrates example steps for obtaining a quantizing 3D SDR histogram and mapped EDR chroma values.

TABLE 6

// STEP 1: 3D SDR histogram and 3D-mapped EDR chroma values initialization
$\Omega_{t,q}^{Q,s} = 0$ where $q = (q_y, q_{C_0}, q_{C_1})$ and $q_{ch} = 0, \ldots, Q_{ch} - 1$, for each ch = $\{y, C_0, C_1\}$
$\Psi_{t,C_0,q}^{Q,v} = 0$ where $q = (q_y, q_{C_0}, q_{C_1})$ and $q_{ch} = 0, \ldots, Q_{ch} - 1$, for each ch = $\{y, C_0, C_1\}$
$\Psi_{t,C_1,q}^{Q,v} = 0$ where $q = (q_y, q_{C_0}, q_{C_1})$ and $q_{ch} = 0, \ldots, Q_{ch} - 1$, for each ch = $\{y, C_0, C_1\}$
// STEP 2: scan for each pixel in SDR and EDR-chroma
  for (i = 0; i < $P_C$; i ++){

$q_y = \left\lfloor \dfrac{s_{t,i}^{y,d}}{Q_y} \right\rfloor;$   // SDR downsampled-luma quantized value $q_{C_0} = \left\lfloor \dfrac{s_{t,i}^{C_0}}{Q_{C_0}} \right\rfloor;$   // SDR chroma 0 quantized value $q_{C_1} = \left\lfloor \dfrac{s_{t,i}^{C_1}}{Q_{C_1}} \right\rfloor;$   // SDR chroma 1 quantized value $\Omega_{t,q}^{Q,s}$ ++;                                     // 3D SDR histogram
  $\Psi_{t,C_0,q}^{Q,v} = \Psi_{t,C_0,q}^{Q,v} + v_{t,i}^{c0};$ // Mapped EDR $C_0$ values
  $\Psi_{t,C_1,q}^{Q,v} = \Psi_{t,C_1,q}^{Q,v} + v_{t,i}^{c1};$ // Mapped EDR $C_1$ values
}

Let ($s_q^{y,(B)}$, $s_q^{C_0,(B)}$, $s_q^{C_1,(B)}$) represent the center of the q'th SDR bin. The q'th frame-specific subscript is omitted in ($s_q^{y,(B)}$, $s_q^{C_0,(B)}$, $s_q^{C_1,(B)}$) or the bin representative values to denote that these bin representative values can be used for all frames. In one embodiment, the bin representative values are pre-computed and are fixed for all frames. Table 7 illustrates the steps to obtain the bin representative values ($s_q^{y,(B)}$, $s_q^{C_0,(B)}$, $s_q^{C_1,(B)}$).

TABLE 7

// Set for each bin the SDR mapping values
// Recall that the bin index $q = (q_y, q_{C_0}, q_{C_1})$.
for ($q_y = 0$; $q_y < Q_y$; $q_y$ ++)
  for ($q_{C_0} = 0$; $q_{C_0} < Q_{C_0}$; $q_{C_0}$ ++)
    for ($q_{C_1} = 0$; $q_{C_1} < Q_{C_1}$; $q_{C_1}$ ++) {

$s_q^{y,(B)} = \dfrac{(q_y + 0.5)}{Q_y}$   // SDR normalized bin-value luma component $s_q^{C_0,(B)} = \dfrac{(q_{C_0} + 0.5)}{Q_{C_0}}$   // SDR normalized bin-value Cb component $s_q^{C_1,(B)} = \dfrac{(q_{C_1} + 0.5)}{Q_{C_1}}$   // SDR normalized bin-value Cr component

}

Next, average 3D mapping EDR chroma values can be obtained by averaging the EDR chroma values over the number of SDR pixels (of the input SDR frame at time=t) in each of the respective bins. In one embodiment, for a current frame at time=t, 3D SDR histogram bins with no corresponding pixels are identified and discarded. Table 8 illustrates the steps for obtaining the averages for $\bar{\Psi}_{t,C_0}^{Q,v}$ and $\bar{\Psi}_{t,C_1}^{Q,v}$, e.g., the 3D mapping of EDR chroma values averaged over the number of SDR pixels in each respective bin. Note that $q_0, q_1, \ldots, q_{k-1}$, are indices for k total bins that have corresponding pixels, e.g., $\Psi_{t,q}^{Q,s} \neq 0$.

Table 8

```
// Set for each bin the SDR mapping values
// The non-zero bin index q_i = (q_y, q_{C_0}, q_{C_1}).
for (i = 0; i < k; i++) {
```

$$\bar{\Psi}_{t,C_0,q_i}^{Q,v} = \frac{\Psi_{t,C_0,q_i}^{Q,v}}{\Omega_{t,q_i}^{Q,s}}; \qquad // \text{ Average 3D-Mapping EDR } C_0 \text{ values}$$

$$\bar{\Psi}_{t,C_1,q_i}^{Q,v} = \frac{\Psi_{t,C_1,q_i}^{Q,v}}{\Omega_{t,q_i}^{Q,s}}; \qquad // \text{ Average 3D-Mapping EDR } C_1 \text{ values}$$

}

Let the EDR chroma vector for the $q_i$'th bin to be:

$$v_{t,q_i} = \begin{bmatrix} \bar{\Psi}_{t,C_0,q_i}^{V} \\ \bar{\Psi}_{t,C_1,q_i}^{Q,v} \end{bmatrix}.$$

For each $q_i$'th bin, a 3D-FMT vector being an element of the $\bar{S}_t$ matrix, can be:

$$s_{t,q_i}^T = [1 \; s_{q_i}^{y,(B)} s_{q_i}^{C_0(B)} s_{q_i}^{C_1(B)} \ldots s_{q_i}^{y,(B)} s_{q_i}^{C_0,(B)} \ldots (s_{q_i}^{y,(B)} s_{q_i}^{C_0,(B)})^2 \ldots (s_{q_i}^{C_0,(B)})^2 (s_{q_i}^{C_1,(B)})^2 \ldots ].$$

As described earlier, there are k bins that have at least one corresponding SDR pixel. In one embodiment, matrices A and B are determined using the SDR bin representative values and EDR chroma values from these k bins. For example, matrices $\bar{S}_t$ and $V_t$ for the input frame at time=t can be:

$$\bar{S}_t = \begin{bmatrix} \bar{s}_{t,q_0}^T \\ \bar{s}_{t,q_1}^T \\ \vdots \\ \bar{s}_{t,q_{k-1}}^T \end{bmatrix} \text{ and } V_t = \begin{bmatrix} v_{t,q_0}^T \\ v_{t,q_1}^T \\ \vdots \\ v_{t,q_{k-1}}^T \end{bmatrix}.$$

Note that the dimensions of these matrices would be different from the earlier pixel-based method because there are k non-zero SDR bins that are used for MMR estimation rather than the total SDR frame pixels count (which can be much greater than k). Here, k can vary frame-to-frame.

Next, statistics or matrices A and B for the current frame can be obtained as:

$$A_t = \bar{S}_t^T \bar{S}_t$$

$$B_t = \bar{S}_t^T V_t.$$

In one embodiment, to reduce a computational load, matrices A and B can be stored as cumulative sums Table 9 describes an example of MMR statistics computations using 3D-FMT.

TABLE 9

$$V_t = \begin{bmatrix} v_{t,q_0}^T \\ v_{t,q_1}^T \\ \vdots \\ v_{t,q_{k-1}}^T \end{bmatrix} \text{ and } \bar{S}_t = \begin{bmatrix} \bar{s}_{t,q_0}^T \\ \bar{s}_{t,q_1}^T \\ \vdots \\ \bar{s}_{t,q_{k-1}}^T \end{bmatrix}$$

Figure 10:
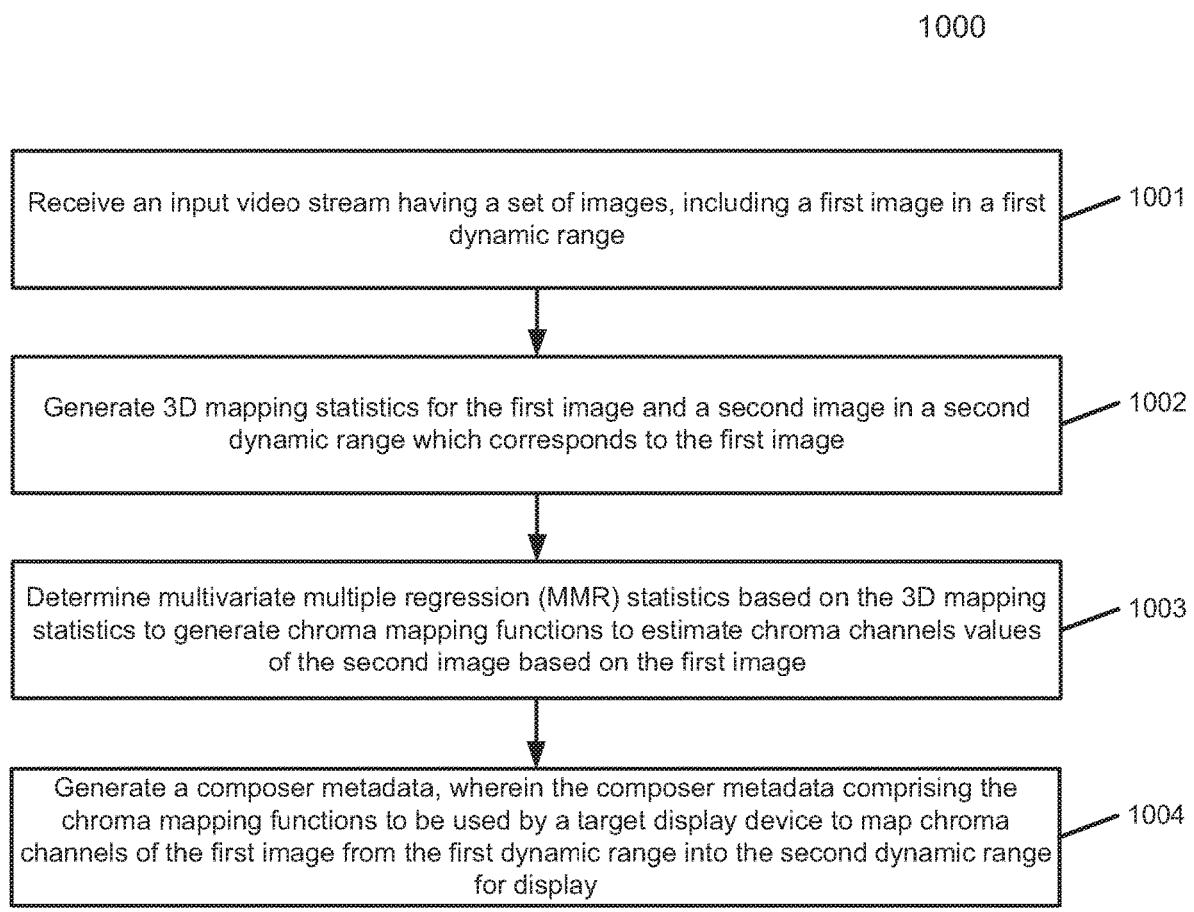
FIG. 10 is a flowchart that shows a method according to one or more embodiments.

$A_t = \bar{S}_t^T \bar{S}_t$
$B_t = \bar{S}_t^T V_t$
$A_t^C = A_{t-1}^C + A_t$
$B_t^C = B_{t-1}^C + B_t$ FIG. 10 is a flowchart that shows a method for luma/chroma reshaping using 3D-FMT according to one or more embodiments. Method or process 1000 may be performed by processing logic which may include software, hardware, or a combination thereof. For example, process 1000 may be performed by encoder 303 of FIG. 3. Referring to FIG. 10, at block 1001, processing logic receives an input video stream having a set of images, including a first image in a first dynamic range. At block 1002, processing logic generates 3D mapping statistics (or 3D SDR and EDR histogram) for the first image and a second image in a second dynamic range which corresponds to the first image, where the second dynamic range is higher than the first dynamic range. At block 1003, processing logic determines multivariate multiple regression (MMR) statistics (e.g., matrices A and B) based on the 3D mapping statistics to generate chroma mapping functions to estimate chroma channels values of the second image based on the first image. At block 1004, processing logic generates a composer metadata, where the composer metadata includes the chroma mapping functions to be used by a target display device to map chroma channels of the first image from the first dynamic range into the second dynamic range for display. In some embodiments, a non-transitory machine-readable medium stores instructions which when executed by a display management system cause the system to perform a method as in method 1000. In some embodiments, a display management system which includes a memory and a processing system configured to perform a method as in method 1000.

Without Reference EDR

Figure 11:
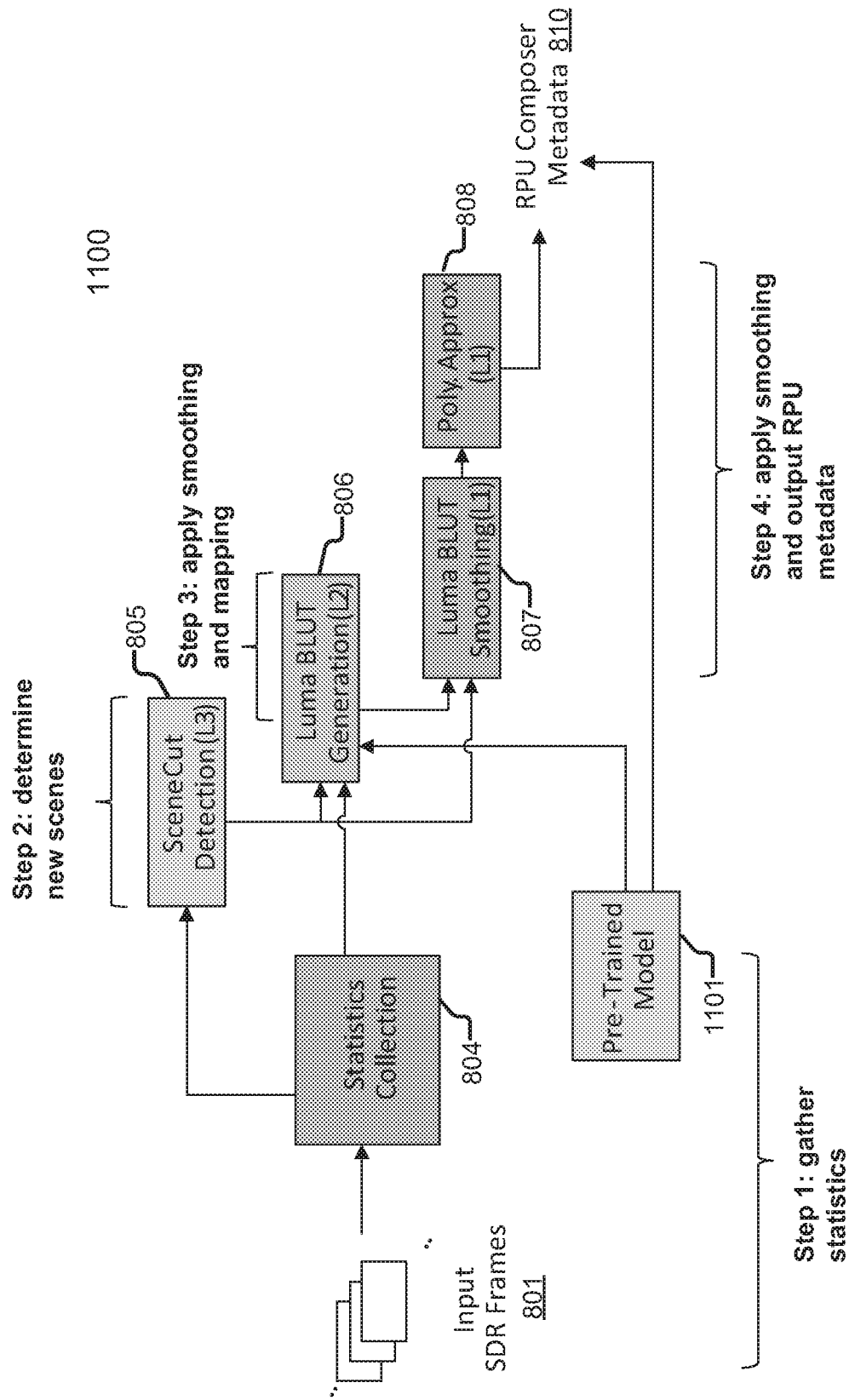
FIG. 11 illustrates a block diagram for an exemplary encoder without reference EDR according to an embodiment.

FIG. 11 illustrates a block diagram for an exemplary encoder without reference EDR according to an embodiment. Encoder 1100 can be an encoder such as encoder 303 of FIG. 3. Encoder 1100 can generate, on-the-fly, RPU (composer and DM) metadata from SDR frames of a video stream, without HDR reference, in a one-frame-in one-frame-out fashion. In one embodiment, encoder 1100 includes modules such as pre-trained model 1101, statistics collection 804, scene cut detection (L3) 805, luma BLUT generation (L2) 806, luma BLUT smoothing (L1) 807, and polynomial approximation (L1) 808. Pre-trained model 1101 can include a general linear model (GLM) to generate chroma reshaping functions. The GLM may be predetermined or preconfigured from training statistics or previously trained based on a library of images. In one embodiment, chroma reshaping functions include static MMR coefficients.

Statistics collection 804 can gather statistics about the SDR and HDR frames 801-802. Scene cut detection (L3) 805 can determine a scene cut data that identifies a new scene in the input SDR frames. Luma BLUT generation (L2) 806 can generate a luma reshaping function to map a luma component of input SDR frames to HDR frames. Luma BLUT smoothing (L1) 807 can apply a smoothing algorithm to the generated luma reshaping function. Polynomial Approximation (L1) 808 can approximate luma reshaping functions into polynomial functions so luma reshaping functions are reduced to polynomial coefficients to reduce data storage and data transmission. The luma and chroma reshaping functions can be used to generate output RPU metadata 810.

In some embodiments, encoder 1100 generates output RPU metadata 810 in four steps. Each step can use one or more sliding windows, such as a statistics window (502), L3, L2, and L1 sliding windows (503, 504, and 505) of FIG. 5, to produce intermediary outputs.

Referring to FIG. 11, in step one, with reference to an input SDR frame (as part of SDR frames 801) at time=t, statistics collection 804 collects or gathers statistics for the input SDR frame and stores these statistics in a statistics ring buffer, such as statistics ring buffer 502 of FIG. 5A. Statistics collection 804 can gather statistics including, but not limited to, scene cut statistics, luma minimum, mean, and maximum statistics, luma histogram statistics, and chroma saturation statistics for the input SDR frame. Scene cut statistics detect new scenes in the SDR frame of a video stream. The luma minimum, mean, and maximum statistics, and luma histogram statistics are used to dynamically estimate and generate a luma reshaping function. The chroma saturation statistics are used to normalize chroma reshaping functions.

First, statistics collection 804 gathers statistics for a normalized (between 0 and 1) SDR frame (denoted by $(s_{t,i}^{y,d,n}, s_{t,i}^{c0,n}, s_{t,i}^{c1,n})$) using down-sampled luma and chroma SDR pixel values. In some embodiments, the gathered statistics include a luma histogram and chroma saturation values. In some embodiments, the luma histogram and chroma saturation in luma bins can be obtained as illustrated by Table 10. In some embodiments, the total number of luma and chroma bins is initialized to $N_L = N_C = 8$ respectively.

TABLE 10

```
// initialization
h̄_{t,N_L}^y (b) = 0      for b = 0, 1, . . . , N_L − 1 // luma bins
π̄_{t,N_C} (b) = 0      for b = 0, 1, . . . , N_C − 1// chroma saturation in luma bins
h̄_{temp,N_C}^y (b) = 0   for b = 0, 1, . . . , N_C − 1// luma bins for normalizing chroma saturation
// collecting luma histogram and chroma saturation in luma bins
for (i = 0; i < PC; i++)
    // find the luma bin index for i^{th} pixel
    b_L = ⌊s_{t,i}^{y,d,n} · N_L⌋        // Quantization of codewords into N_L bins
    b_C = ⌊s_{t,i}^{y,d,n} · N_C⌋        // Quantization of codewords into N_C bins
    // compute luma histogram for N_L bins
    h̄_{t,N_L}^y (b_L) = h̄_{t,N_L}^y (b_L) + 1
    // compute chroma saturation for the luma bin
    π̄_{t,N_C} (b_C) = π̄_{t,N_C} (b_C) + (s_{t,i}^{c0,n} − 0.5)^2 + (s_{t,i}^{c1,n} − 0.5)^2
    // compute luma histogram for N_C bins for normalizing chroma saturation
    h̄_{temp,N_C}^y (b_C) = h̄_{temp,N_C}^y (b_C) + 1
End
// normalizing chroma saturation with luma histogram
for (b_C = 0; b_C < N_C; b_C ++)
    if (h̄_{temp,N_C}^y (b_C) > 0)

π̄_{t,N_C}(b_C) = (π̄_{t,N_C}(b_C)) / (h̄_{temp,N_C}^y(b_C))

else
        π̄_{t,N_C} (b_C) = 0
    end
End
```

In step two of FIG. 11, which can be similar to step two of FIG. 8 as described above, scene cut detection 805 determines the scene cut occurrences or scene cut data for SDR frame $$f_{t-\tau_3^a}^s,$$

a frame at time=$t-\tau_3^a$ using the gathered scene cut statistics. The scene cut data can be stored in a ring buffer by updating the oldest scene-cut data. The scene cut data can be used as inputs for subsequent steps.

In step three, luma BLUT generation 806 generates a luma BLUT (e.g., $$T_{t-\tau_3^a-\tau_2^a}^{L2})$$

for $$f_{t-\tau_3^a-\tau_2^a},$$

a frame at time $t-\tau_3^a-\tau_2^a$, using previously gathered averaging statistics. The gathered averaging statistics can include one or more feature vectors describing the SDR frames. In some embodiments, feature vectors can include, but are not limited to i) averaged orders of min/max/mean SDR pixel values, $$g_{t-\tau_3^a-\tau_2^a,0};$$

ii) averaged luma histogram values $$(\bar{h}_{t-\tau_3^a-\tau_2^a,N_L}^{y,L2}),$$

e.g., $$g_{t-\tau_3^a-\tau_2^a,1};$$

and iii) averaged chroma saturation values for the luma bins $$(\bar{\pi}_{t-\tau_3^a-\tau_2^a,N_C}^{L2}),$$

e.g., $$g_{t-\tau_3^a-\tau_2^a,2}.$$

The feature vectors can be used for a general linear model (GLM)-based prediction.

Let $$\left(g_{t-\tau_3^a-\tau_2^a, j, k}\right)$$

represent the k'th individual feature of the j'th feature vector for $$f_{t-\tau_3^a-\tau_2^a}.$$

In one embodiment, each feature vector consists of feature values concatenated to form a one dimensional vector, such as:

$$g_{t-\tau_3^a-\tau_2^a, j} = \begin{bmatrix} g_{t-\tau_3^a-\tau_2^a, j, 0} \\ g_{t-\tau_3^a-\tau_2^a, j, 1} \\ \vdots \\ g_{t-\tau_3^a-\tau_2^a, j, G_j - 1} \end{bmatrix}$$

where $G_j$ (j=0, 1, 2, ... ) is the total number of features for the j'th feature vector. In one embodiment, first, second, third, and fourth orders of min/max/mean SDR values are used as features for the GLM-based prediction. In this case, $$g_{t-\tau_3^a-\tau_2^a, 0}$$

has 12 features, $$g_{t-\tau_3^a-\tau_2^a, 1}$$

has 8 features ($N_L$=8) and $$g_{t-\tau_3^a-\tau_2^a, 2}$$

has 8 features ($N_C$=8) for a total of 28 features.

Let $t_{L2}^{(l)}$ and $t_{L2}^{(r)}$ denote the time indices of the left and right window boundaries. In one embodiment, luma BLUT 806 generation can determine scene boundaries for frame $$f_{t-\tau_3^a-\tau_2^a}$$

based on scene cut data which is generated by scene cut detection 805. Let $t_{SC,L2}^{(l)}$ and $t_{SC,L2}^{(r)}$ be the left and right scene boundaries for $$f_{t-\tau_3^a-\tau_2^a}.$$

The left and right boundaries of the L2 window for $$f_{t-\tau_3^a-\tau_2^a}$$

are thus $t_{L2}^{(l)}$ and $t_{L2}^{(r)}$ respectively. The corresponding left and right frames of L2 window are thus $$f_{t_{L2}^{(l)}} \text{ and } f_{t_{L2}^{(r)}}$$

respectively. Table 11 illustrates example calculations for averaged feature values for a L2 window of frames as described above.

TABLE 11

// Step 0: Initialize L2 Stats $$s_{t-\tau_3^a-\tau_2^a}^{L,L2}, s_{t-\tau_3^a-\tau_2^a}^{H,H2}, s_{t-\tau_3^a-\tau_2^a}^{M,L2}, \overline{h}_{t-\tau_3^a-\tau_2^a, N_L}^{y,L2}, \overline{\pi}_{t-\tau_3^a-\tau_2^a, N_C}^{L2} = 0$$

// STEP 1: Find L2 window boundary
$t_{L2}^{(l)} = \max(t - \tau_3^a - (\tau_2^a + \tau_2^b), t_{SC,L2}^{(l)})$
$t_{L2}^{(r)} = \min(t - \tau_3^a, t_{SC,L2}^{(r)})$
$n_{L2}^f = t_{L2}^{(r)} - t_{L2}^{(l)} + 1$ // Total number of frames in the sliding window
// STEP 2: Obtain L2 averaged min/max/mean SDR pixel values and their orders
for (i = $t_{L2}^{(l)}$; i ≤ $t_{L2}^{(r)}$; i++{

$$s_{t-\tau_3^a-\tau_2^a}^{L,L2} += \frac{1}{n_{L2}^f}(s_i^L)^2; s_{t-\tau_3^a-\tau_2^a}^{H,L2} += \frac{1}{n_{L2}^f}s_i^H; s_{t-\tau_3^a-\tau_2^a}^{M,L2} += \frac{1}{n_{L2}^f}s_i^M; \text{ // } 1^{st} \text{ order}$$

$$\{s_{t-\tau_3^a-\tau_2^a}^{L,L2}\}^2 += \frac{1}{n_{L2}^f}(s_i^L)^2; \{s_{t-\tau_3^a-\tau_2^a}^{H,L2}\}^2 += \frac{1}{n_{L2}^f}(s_i^H)^2; \{s_{t-\tau_3^a-\tau_2^a}^{M,L2}\}^2 += \frac{1}{n_{L2}^f}(s_i^M)^2; \text{ // } 2^{nd} \text{ order}$$

$$\{s_{t-\tau_3^a-\tau_2^a}^{L,L2}\}^3 += \frac{1}{n_{L2}^f}(s_i^L)^3; \{s_{t-\tau_3^a-\tau_2^a}^{H,L2}\}^3 += \frac{1}{n_{L2}^f}(s_i^H)^3; \{s_{t-\tau_3^a-\tau_2^a}^{M,L2}\}^3 += \frac{1}{n_{L2}^f}(s_i^M)^3; \text{ // } 3^{rd} \text{ order}$$

$$\{s_{t-\tau_3^a-\tau_2^a}^{L,L2}\}^4 += \frac{1}{n_{L2}^f}(s_i^L)^4; \{s_{t-\tau_3^a-\tau_2^a}^{H,L2}\}^4 += \frac{1}{n_{L2}^f}(s_i^H)^4; \{s_{t-\tau_3^a-\tau_2^a}^{M,L2}\}^4 += \frac{1}{n_{L2}^f}(s_i^M)^4; \text{ // } 4^{th} \text{ order}$$

}

TABLE 11-continued

```
// STEP 3: Obtain L2 averaged luma histogram
for (i = t_L2^(l); i ≤ t_L2^(r); i++){
    for (b = 0; b < N_L; b++)
```

$$\overline{h}^{y,L2}_{t-\tau_3^q-\tau_2^q,N_L}(b) \mathrel{+}= \frac{1}{n^f_{L2}} \overline{h}^y_{i,N_L}(b); \text{ // Luma histogram}$$

```
    }
}
// STEP 4: Obtain L2 averaged chroma saturation in luma bins
for (i = t_L2^(l); i ≤ t_L2^(r); i++){
    for (b = 0; b < N_C; b++)
```

$$\overline{\pi}^{L2}_{t-\tau_3^q-\tau_2^q,N_C}(b) \mathrel{+}= \frac{1}{n^f_{L2}} \overline{\pi}_{i,N_C}(b); \text{ // Chroma saturation in luma histogram bins}$$

```
    }
}
```

Next, in one embodiment, a total feature vector F for a frame at $$\text{time} = f_{t-\tau_3^q-\tau_2^q}$$

can be generated by concatenating 28 features, such as:

$$F_{t-\tau_3^q-\tau_2^q} = \lfloor g_{t-\tau_3^q-\tau_2^q,0} \quad g_{t-\tau_3^q-\tau_2^q,1} \quad g_{t-\tau_3^q-\tau_2^q,2} \rfloor.$$

In another embodiment, the total feature vector F can be generated by concatenating a subset of the 28 features. The total feature vector F can then be applied to a GLM model.

Let W be a coefficient (or weight)-matrix of a GLM model. In one embodiment, W is pre-computed using a SDR-EDR image database. A k-point luma BLUT vector $\hat{v}^k$ for current frame, can then be described by a GLM model, such as $$\hat{v}^k_{t-\tau_3^q-\tau_2^q} = WF_{t-\tau_3^q-\tau_2^q}.$$

In one embodiment, the k-point luma BLUT vector is clipped, interpolated and clipped again to produce intermediate luma BLUT. In one embodiment, the k-point luma BLUT vector is then processed to maintain a monotonicity in a non-decreasing behavior, to obtain $$T^{L2}_{t-\tau_3^q-\tau_2^q},$$

the luma BLUT for the frame at time=$t-\tau_3^a-\tau_2^a$. Note, $$T^{L2}_{t-\tau_3^q-\tau_2^q,b}$$

represents a normalized EDR value mapped from the b'th SDR codeword.

To generate a chroma reshaping function, luma BLUT generation 806 can obtain static MMR coefficients from a pre-train model 1101. The static MMR coefficients can be pre-computed based on training data and can be kept the same for all SDR frame. In one embodiment, the static MMR coefficients may be kept the same for only a scene.

In step four, final output luma BLUT for $$f_{t-\tau_3^q-\tau_2^q-\tau_1^q}$$

can be computed by applying a smoothing operating using the L1 window on to the luma BLUT computed from the previous step. Scene cut information $SC_{(t)}$ can be used to determine the L1 window boundaries. Recall that $$T^{L1}_{t-\tau_3^q-\tau_2^q-\tau_1^q,b}$$

is the b'th bin of final luma BLUT. The left and right boundaries of the L1 window for $$f_{t-\tau_3^q-\tau_2^q-\tau_1^q}$$

can be determined similar to step four as described above for FIG. 8. The final output luma BLUT can then be converted to a piecewise polynomial. RPU metadata (e.g., composer metadata) can be generated using the luma piecewise polynomial and fixed chroma MMR coefficients for frame $f_{t-\tau_{tot}}$, where $\tau_{tot}=\tau_3^a+\tau_2^a+\tau_1^a$.

Figure 12:
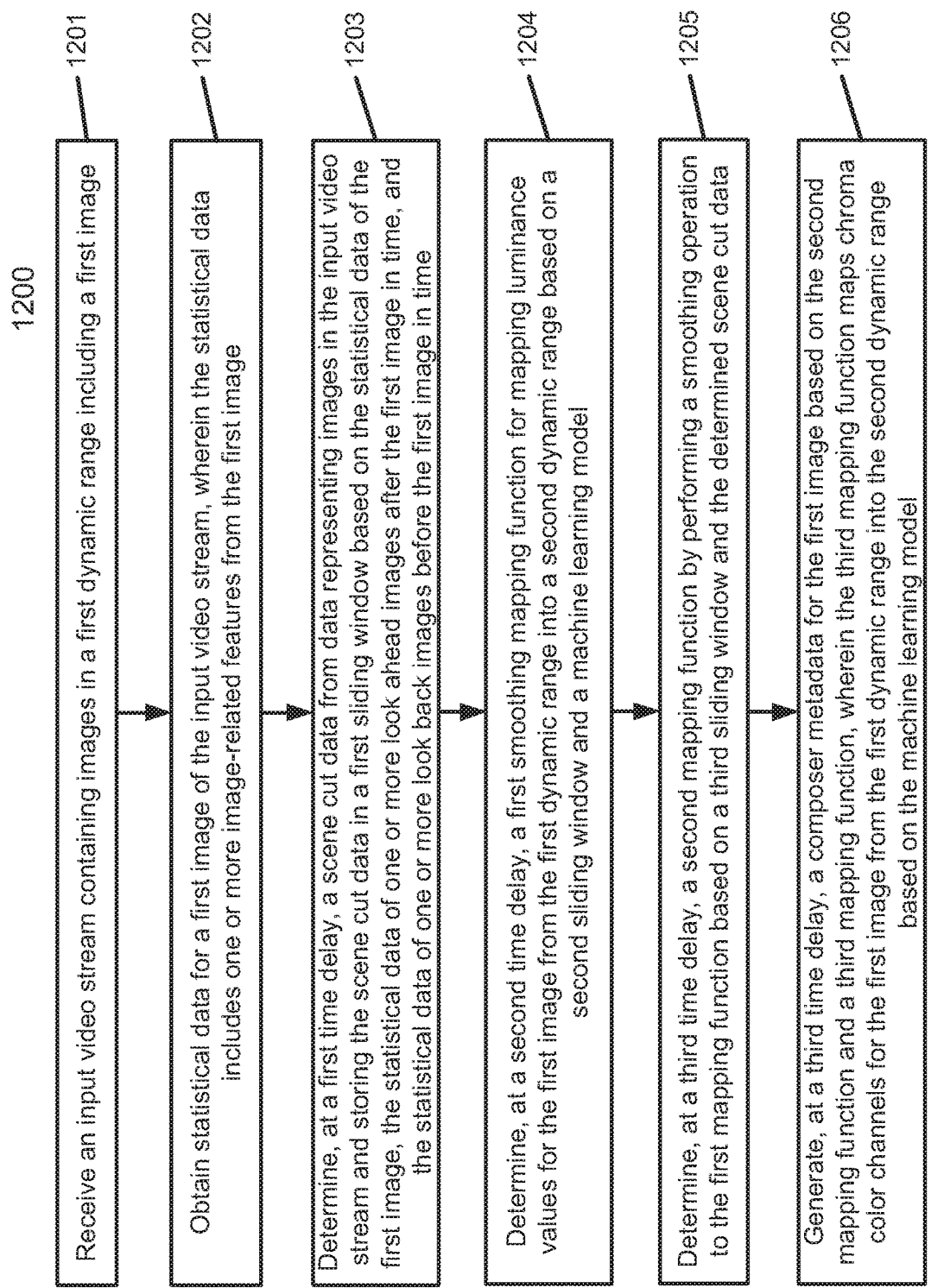
FIG. 12 is a flowchart that shows a method according to one or more embodiments.

FIG. 12 is a flowchart that shows a method for luma and/or chroma reshaping without reference EDR according to one or more embodiments. Method or process 1200 may be performed by processing logic which may include software, hardware, or a combination thereof. For example, process 1200 may be performed by encoder 303 of FIG. 3. Referring to FIG. 12, at block 1201, processing logic receives an input video stream containing images in a first dynamic range including a first image. At block 1202, processing logic obtains statistical data for a first image of the input video stream, where the statistical data includes one or more image-related features from the first image. At block 1203, processing logic determines, at a first time delay, a scene cut data from data representing images in the input video stream and storing the scene cut data in a first sliding window based on the statistical data of the first image, the statistical data of one or more look ahead images after the first image in time in the input video stream, and the statistical data of one or more look back images before the first image in time in the input video stream. At block 1204, processing logic determines, at a second time delay, a first mapping function for mapping luminance values for the first image from the first dynamic range into a second dynamic range based on a second sliding window and a machine learning model. At block 1205, processing logic determines, at a third time delay, a second mapping function by performing a smoothing operation to the first mapping function based on a third sliding window and the determined scene cut data. At block 1206, processing logic generates, at a third time delay, a composer metadata for the first image based on the second and a third mapping functions, where the third mapping functions maps chroma color channels for the first image from the first dynamic range into the second dynamic range based on the machine learning model, where the generated composer metadata are used by a target display device to display a second image, which corresponds to the first image in the second dynamic range. In some embodiments, a non-transitory, machine-readable medium stores instruction which when executed by a display management system cause the system to perform a method as in method 1200. In some embodiments, a display management system which includes a memory and a processing system configured to perform a method as in method 1200.

Display Management (DM) Metadata Computations

In some embodiments, an encoder such as encoder 303 of FIG. 3 computes DM metadata and generates RPU metadata to include the DM metadata. DM metadata can include information for rendering a display for specific target displays that have capabilities to display up to various units of nits. For example, DM metadata can include one or more display information, such as, min_PQ, max_PQ, avg_PQ, anchor_PQ, and anchor_power. Min_PQ can specify the minimum luminance value of current scene in a 12-bit PQ encoding. Max_PQ can specify the maximum luminance value of current scene in a 12-bit PQ encoding. Avg_PQ can specify the midpoint luminance value of current scene in a 12-bit PQ encoding. Anchor_PQ can specify the average brightness optimized for picture quality of current frame in a 12-bit PQ encoding. Anchor_power can specify the average brightness optimized for power management of current frame in a 12-bit PQ encoding.

In some embodiments, a processor of the encoder, such as encoder 303 of FIG. 3, estimates the DM metadata for a current output frame without any scene information. In one embodiment, the processor sets min_PQ=0, and max_PQ=4095 for all frame. In one embodiment, for SDR frames with EDR reference frames, the processor calculates frame averages (e.g., avg_PQ)($L^{avg}_{t-\tau_3^a-\tau_2^a-\tau_1^a}$)

value for frame $f_{t-\tau_3^a-\tau_2^a-\tau_1^a}$ as $$L^{avg}_{t-\tau_3^a-\tau_2^a-\tau_1^a} = \frac{1}{3P}\sum_{p=0}^{P-1}\left(v^R_{t-\tau_3^a-\tau_2^a-\tau_1^a,p} + v^G_{t-\tau_3^a-\tau_2^a-\tau_1^a,p} + v^B_{t-\tau_3^a-\tau_2^a-\tau_1^a,p}\right),$$

using RGB domain EDR images. In one embodiment, for SDR frames without EDR reference frames, avg_PQ can be calculated as:

$$L^{avg}_{t-\tau_3^a-\tau_2^a-\tau_1^a} \approx \frac{1}{P}\sum_{b=0}^{M-1} h^s_{t-\tau_3^a-\tau_2^a-\tau_1^a,b} \cdot T^{Lx}_{t-\tau_3^a-\tau_2^a-\tau_1^a,b}$$

based on the luma component of an SDR luma histogram and a BLUT computed at a generic (e.g., any Lx) sliding window. Examples of these calculations may be found in U.S. Provisional Application No. 62/520,832, entitled "Efficient End-to-End Single Layer Inverse Display Management Coding" filed on Jun. 16, 2017, which is incorporated herein by reference in its entirety.

In some embodiments, because avg_PQ needs to be averaged in any particular scene, a window-based averaging for a number of the frame can be applied to avg_

$PQ(e.g.,L^{avg}_{t-\tau_3^a-\tau_2^a-\tau_1^a})$ without any scene information. For example, referring to FIG. 13, for the with EDR reference mode, a window of length $\tau_{DM}\leq\tau_1^a$ for both sides of frame $f_{t-\tau_3^a-\tau_2^a-\tau_1^a}$ can be used after scenes are detected to determine the avg_PQ for that frame, without introducing a delay.

In one embodiment, for without EDR reference mode, avg_PQ is generated by applying a window based averaging based on an output luma BLUT generated at L1 window, with a window of look ahead and look back lengths of $\tau_{DM}^a$, $\tau_{DM}^b$, respectively. E.g., an additional output delay of $\tau_{DM}^a$ time-units would be introduced. In this case, the total output delay for a frame's RPU data will be ($\tau_3^a+\tau_2^a+\tau_1^a+\tau_{DM}^a$) and the frame-based average estimates are computed as:

$$L^{avg}_{t-\tau_3^a-\tau_2^a-\tau_1^a+t_k} \approx \frac{1}{P}\sum_{b=0}^{M-1} h^s_{t-\tau_3^a-\tau_2^a-\tau_1^a+t_k,b} \cdot T^{L1}_{t-\tau_3^a-\tau_2^a-\tau_1^a+t_k,b},$$

where $t_k$ ranges from $(-\tau_{DM}^a, \tau_{DM}^b)$. Then an average is computed over this interval to obtain the final avg_PQ for the current output frame $f_{t-\tau_3^a-\tau_2^a-\tau_1^a}.$ In one embodiment, to avoid the $\tau_{DM}^a$ time unit delay, an encoder can estimate the frame averages based on at least an intermediate (or unsmoothed) luma BLUTs obtained from the L2 window, e.g., $T_i^L 2$. For example, based on L2-level luma BLUTs used as an approximation to the output BLUT ($T_i^L 1$), a frame average may be calculated as:

$$L^{avg}_{t-\tau_3^a-\tau_2^a+t_k} \approx \frac{1}{P}\sum_{b=0}^{M-1} h^s_{t-\tau_3^a-\tau_2^a+t_k,b} \cdot T^{L2}_{t-\tau_3^a-\tau_2^a+t_k,b}$$

where $t_k$ ranges from $(-\tau_{DM}, \tau_{DM})$. In this case, a symmetric window of length $\tau_{DM} \leq \tau_1^a$ can be used, after an output from the L2 window is obtained, to calculate avg_PQ. As a result, these calculations may impose no additional delay in a linear encoding method.

Figure 13:
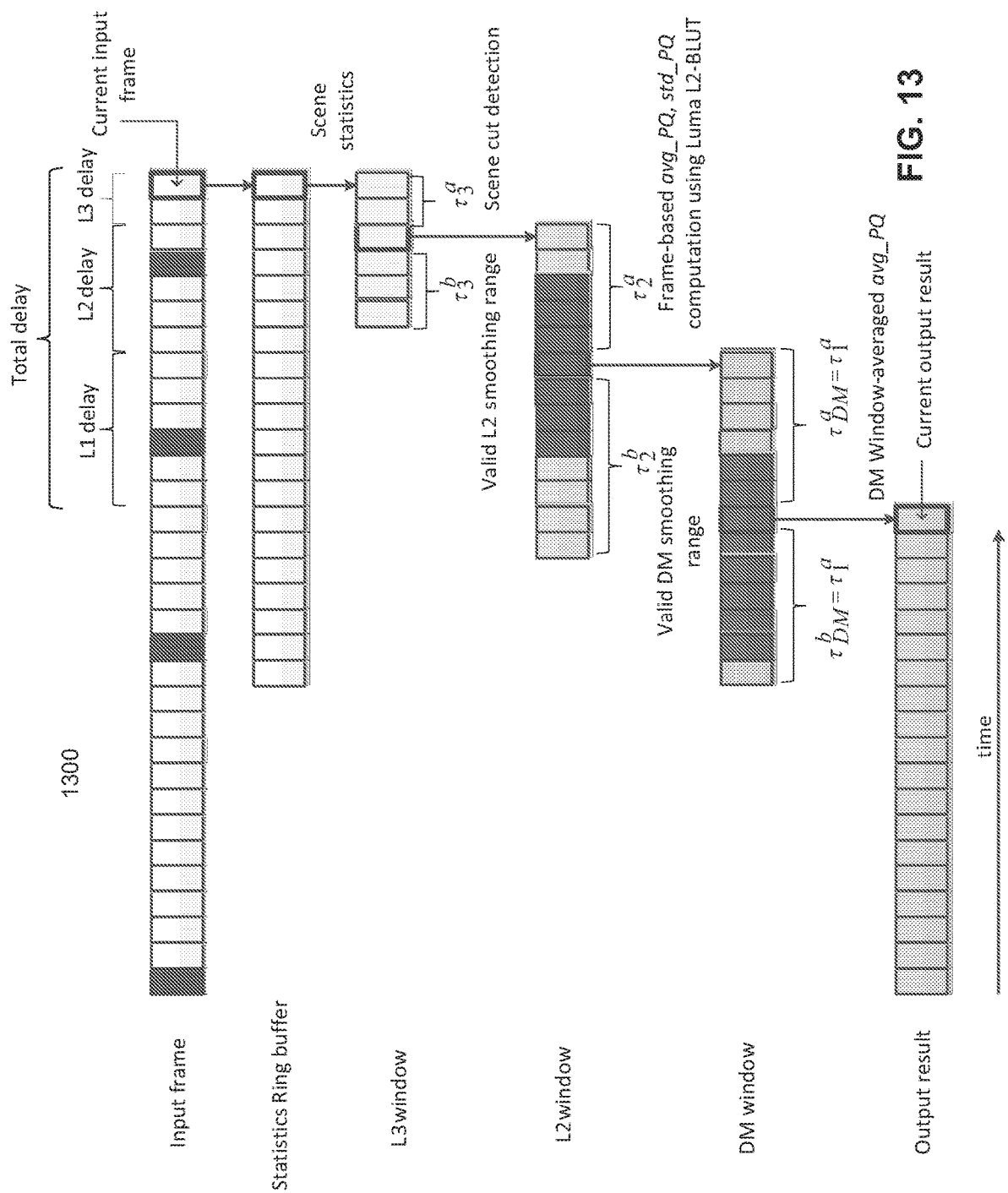
FIG. 13 shows an example process to estimate DM statistics using DM sliding window according to an embodiment.

FIG. 13 illustrates an example of a frame average calculation with a total delay of $(\tau_{L3}{}^a + \tau_{L2}{}^a + \tau_{DM} \leq \tau_{tot})$. Let $t_{DM}^{(l)}$ and $t_{DM}^{(r)}$ denote the time indices of the left and right DM window boundaries for an input frame $f_t$ which is determined using the scene-cut information, in a similar way as step four of FIG. 8. Then, $t_{DM}^{(l)}$ and $t_{DM}^{(r)}$ can be calculated as:

$$t_{DM}^{(l)} = \max(t - \tau_3^a - \tau_2^a - (2 \cdot \tau_{DM}), t_{SC,DM}^{(l)}) \text{ and } t_{DM}^{(r)} = \min(t - \tau_3^a - \tau_2^a, t_{SC,DM}^{(r)}),$$

where $t_{SC,DM}^{(l)}$ and $t_{SC,DM}^{(r)}$ be the left and right scene boundaries for $$f_{t-\tau_3^a-\tau_2^a-\tau_{DM}}.$$

When $\tau_{DM} = \tau_{L1}{}^a$ as depicted in FIG. 13, the left, right scene boundaries can be the same as that of the L1-window and the avg_PQ estimation output frame can be the same as the final output frame $$f_{t-\tau_3^a-\tau_2^a-\tau_{L1}^a}.$$

In this case, no additional delay is introduced due to avg_PQ computations. Therefore, the total computation delay in this case is $\tau_{L3}{}^a + \tau_{L2}{}^a + \tau_{DM} = \tau_{tot}$.

Next, $$\bar{L}_{t-\tau_3^a-\tau_2^a-\tau_{DM}}^{avg},$$

the sliding window based avg_PQ for the frame $$f_{t-\tau_3^a-\tau_2^a-\tau_{DM}}$$

can be computed as:

$$\bar{L}_{t-\tau_3^a-\tau_2^a-\tau_{DM}}^{avg} = \frac{1}{(t_{DM}^{(r)} - t_{DM}^{(l)} + 1)} \cdot \sum_{t=t_{DM}^{(l)}}^{t_{DM}^{(r)}} L_t^{avg}.$$

Table 12 shows an example of a sliding window-based avg_PQ calculation.

TABLE 12

// STEP 1: Find DM sliding window boundary
$t_{DM}^{(l)} = \max(t - \tau_3^a - \tau_2^a - (2 \cdot \tau_{DM}), t_{SC,DM}^{(l)})$
$t_{DM}^{(r)} = \min(t - \tau_3^a - \tau_2^a, t_{DM})$ $\bar{L}_{t-\tau_3^a-\tau_2^a-\tau_{DM}}^{avg} = 0$ // STEP 2: // Compute frame averages using the L2-BLUTs and frame histograms for (t = $t_{DM}^{(l)}$; t ≤ $t_{DM}^{(r)}$; t ++){

$$\bar{L}_{t-\tau_3^a-\tau_2^a-\tau_{DM}}^{avg} \mathrel{+}= \frac{1}{P}\sum_{b=0}^{M-1} h_{t,b}^s \cdot T_{t,b}^{L2};$$

}
// STEP 3: Average the frame avg $$\bar{L}_{t-\tau_3^a-\tau_2^a-\tau_{DM}}^{avg} = \frac{\bar{L}_{t-\tau_3^a-\tau_2^a-\tau_{DM}}^{avg}}{t_{DM}^{(r)} - t_{DM}^{(l)} + 1}$$

In one embodiment, avg_PQ for $$f_{t-\tau_3^a-\tau_2^a-\tau_{DM}}$$

can be estimated as: Clip3(0, 4095, floor $$(\bar{L}_{t-\tau_3^a-\tau_2^a-\tau_{DM}}^{avg} * 4096 + 0.5)),$$

where Clip3(min, max, val) is defined as val clipped from below by min, and clipped from above by max. In another embodiment, avg_PQ for $$f_{t-\tau_3^a-\tau_2^a-\tau_{DM}}$$

can be estimated as: Clip3((min_PQ+ΔL1AvgMin), max_PQ, avg_PQ).

In some embodiments, anchor_PQ and anchor_power values can be calculated based on one or more frame based statistical values according to examples found in U.S. Provisional Application No. 62/520,832, entitled "Efficient End-to-End Single Layer Inverse Display Management Coding" filed on Jun. 16, 2017, which is incorporated herein by reference in its entirety.

For example, for the scenario of SDR with EDR reference, frame based statistical values can include values calculated using RGB domain EDR images, such as, $$L_{t-\tau_{tot}}^{avg} = \frac{1}{3P}\sum_{p=0}^{P-1}(v_{t-\tau_{tot},p}^R + v_{t-\tau_{tot},p}^G + v_{t-\tau_{tot},p}^B), \text{ and}$$

$$L_{t-\tau_{tot}}^{std} = \sqrt{\frac{1}{3P}\sum_{p=0}^{P-1}((v_{t-\tau_{tot},p}^R - L_{t-\tau_{tot}}^{avg})^2 + (v_{t-\tau_{tot},p}^G - L_{t-\tau_{tot}}^{avg})^2 + (v_{t-\tau_{tot},p}^B - L_{t-\tau_{tot}}^{avg})^2)}$$

For example, for the scenario of SDR without EDR reference, frame based statistical values can include values calculated using luma component of an SDR luma histogram and BLUT computed using a L2 sliding window, such as:

$$L_{t-\tau_{tot}}^{avg} = \frac{1}{P}\sum_{b=0}^{M-1} h_{t-\tau_{tot},b}^s \cdot T_{t-\tau_{tot},b}^{L2}, \text{ and}$$

$$L_{t-\tau_{tot}}^{std} \approx \sqrt{\frac{\sum_{b=0}^{M-1} h_{t-\tau_{tot},b}^s \cdot [T_{t-\tau_{tot},b}^{L2}]^2 - P \cdot (L_{t-\tau_{tot}}^{avg})^2}{(P-1)}}.$$

Examples of these calculations may be found in U.S. Provisional Application No. 62/520,832, entitled "Efficient End-to-End Single Layer Inverse Display Management Coding" filed on Jun. 16, 2017, which is incorporated herein by reference in its entirety.

Figure 14:
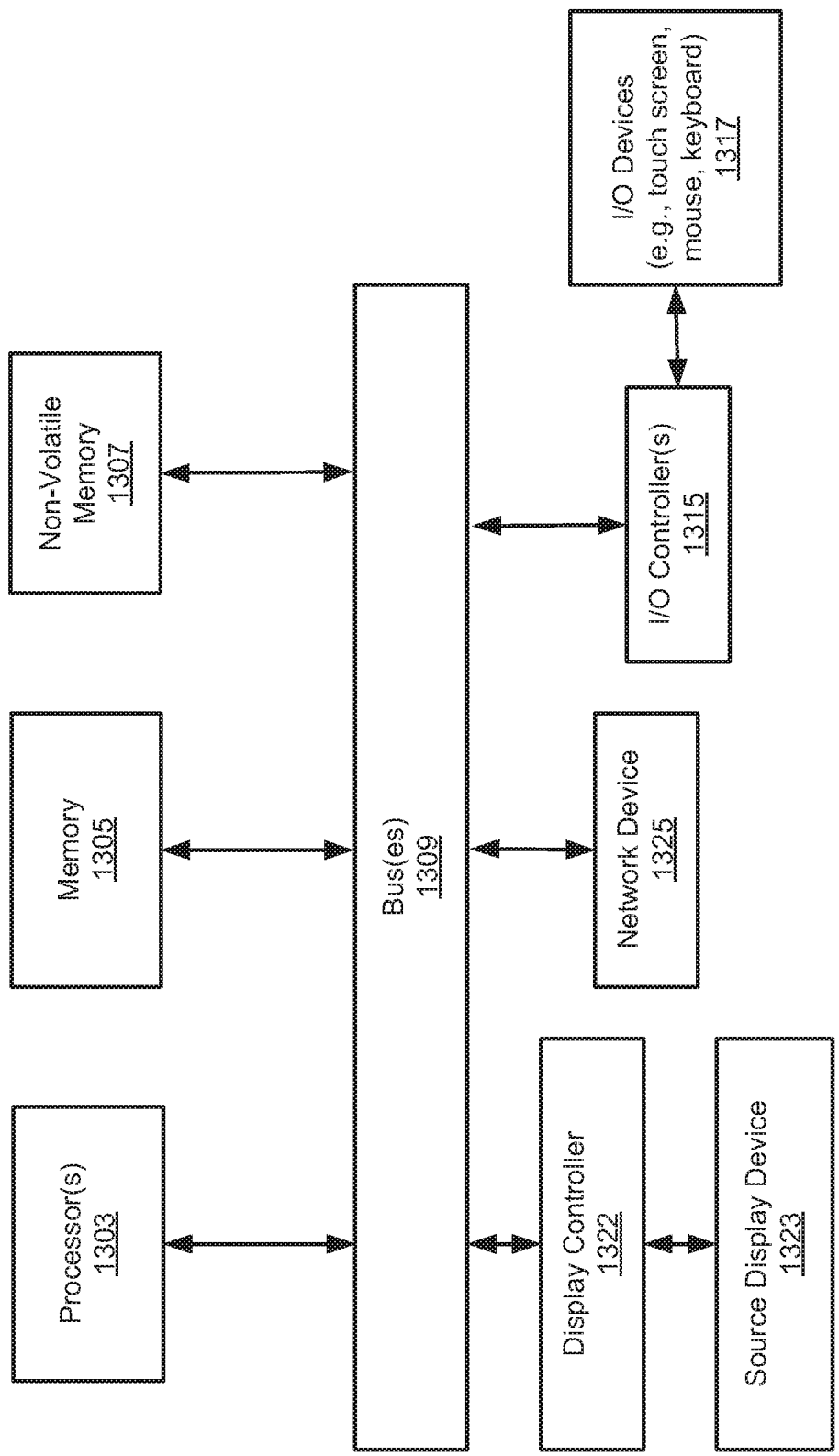
FIG. 14 shows an example of a data processing system that can be used to implement or perform one or more embodiments described herein.

FIG. 14 shows an example of a data processing system that can be used to implement an encoder such as the encoder 303 in FIG. 3. The systems and methods described herein can be implemented in a variety of different data processing systems and devices, including general-purpose computer systems, special purpose computer systems, or a hybrid of general purpose and special purpose computer systems. Data processing systems that can use any one of the methods described herein include desktop computers, laptop computers, tablet computers, embedded electronic devices, or other electronic devices.

FIG. 14 is a block diagram of data processing system hardware according to an embodiment. Note that while FIG. 14 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 14 can also be used with one or more embodiments of the present invention.

As shown in FIG. 14, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a source display device 1323. The source display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The colorist can use the one or more input devices to adjust color trims for one or more images. The input/output devices 1317 are coupled through one or more I/O controllers 1315 as is known in the art.

While FIG. 14 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., Wi-Fi, Bluetooth) that receive images from a camera, etc.

It will be apparent from this description that one or more embodiments of the present invention may be embodied, at least in part, in software. That is, the techniques may be carried out in a data processing system in response to its one or more processor(s) executing a sequence of instructions contained in a storage medium, such as a non-transitory machine-readable storage medium (e.g. DRAM or flash memory). In various embodiments, hardwired circuitry may be used in combination with software instructions to implement the present invention. Thus, the techniques are not limited to any specific combination of hardware circuitry and software, or to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Although separate embodiments are described in detail below, however, it is appreciated that these embodiments may be combined or modified, in part or in whole.

Embodiment 1 is a method for processing image data, the method comprises receiving an input video stream. The method comprises storing over time, in a first buffer, statistical data for a first set of successive portions of the input video stream, the first buffer to provide, for each successive portion, an output representing scene cut data. The method comprises storing over time, in a second buffer, statistical data for a second set of successive portions of the input video stream, the second buffer receiving each output provided from the first buffer, the second buffer to provide, for each successive portion, an output representing a luminance mapping value. The method comprises storing over time, in a third buffer, statistical data for a third set of successive portions of the input video stream, the third buffer receiving each output provided from the second buffer, the third buffer to provide, for each successive portion, an output representing a chroma mapping value. The method comprises generating metadata for a first image in the input video stream based on an associated luminance mapping value and an associated chroma mapping value, the metadata for use by a target display to generate a second image based on the first image but having a higher dynamic range than the first image. In some embodiments, the luminance mapping values are smoothed luminance mapping values.

Embodiment 2 is a non-transitory machine readable medium with stored instructions which when executed by a display management system cause the system to perform a method as in embodiment 1.

Embodiment 3 is a display management system which includes a memory and a processing system configured to perform a method as in embodiment 1.

Embodiment 4 is a method for luma and/or chroma reshaping with a processing system, the method comprises receiving an input video stream containing images in a first dynamic range including a first image. The method comprises receiving a second image representing the first image of the input video stream, the second image having a second dynamic range, wherein the second dynamic range is higher than the first dynamic range. The method comprises obtaining statistical data for the first and the second images. The method comprises determining, at a first time delay, a scene cut data from data representing images in the input video stream and storing the scene cut data in a first sliding window, the scene cut data determined based on the statistical data of the first image, the statistical data of one or more look ahead images after the first image in time in the input video stream, and the statistical data of one or more look back images before the first image in time in the input video stream. The method comprises determining, at a second time delay, a first mapping function for mapping luminance values for the first image from the first dynamic range into the second dynamic range based on a second sliding window and the determined scene cut data. The method comprises determining, at a third time delay, a second mapping function by performing a smoothing operation to the first mapping function based on a third sliding window and the determined scene cut data. The method comprises determining, at the third time delay, a third mapping function for mapping chroma values for the first image from the first dynamic range into the second dynamic range based on the third sliding window and the determined scene cut data. The method comprises generating, at the third time delay, a composer metadata for the first image based on the second and the third mapping functions, wherein the generated composer metadata are used by a target display device to map the first image from the first dynamic range into the second dynamic range for display.

Embodiment 5 is a method of embodiment 4, wherein the composer metadata is generated in a linear fashion by receiving an input image from the input video stream and producing an output composer metadata as one operation such that one input results in one output.

Embodiment 6 is a method of embodiment 4, wherein each of the first, second, and third sliding windows is a buffer that, over time, receives successive portions of the input video stream, each of the portions storing data for a set of consecutive images such that the buffer slides over time over the input video stream.

Embodiment 7 is a method of embodiment 4, wherein the first, second, and third sliding windows include ring memory buffers with configurable buffer lengths.

Embodiment 8 is a method of embodiment 7, wherein the statistical data are obtained in a statistics ring buffer with a configurable buffer length, wherein the buffer length is configured based on the buffer lengths of the first, second, and third sliding windows.

Embodiment 9 is a method of embodiment 4, wherein the obtained statistical data includes scene cut data, luminance, and chroma statistics for the first and second images.

Embodiment 10 is a method of embodiment 4, wherein the first sliding window includes one or more scene cut flags corresponding to new scenes in the corresponding images of the first sliding window, the scene cut flags to cause a smoothing applied to the first mapping function for each scene.

Embodiment 11 is a method of embodiment 4, wherein the second sliding window includes histogram statistics of the first and second images, wherein the histogram statistics include one or more bins representing codewords for pixels of the first or the second images respectively.

Embodiment 12 is a method of embodiment 11, wherein the histogram statistics includes down-sampled first and second images to reduce a computational load, wherein the first and the second images are down-sampled by dividing the codewords for pixels of the first or the second images respectively into a predetermined number of non-overlapping bins.

Embodiment 13 is a method of embodiment 4, wherein determining the first mapping function comprises determining a luminance mapping function based on a first and a second cumulative histograms, wherein the first and the second cumulative histograms are computed from luminance statistics of the first and second images respectively.

Embodiment 14 is a method of embodiment 13, further comprising performing a smoothing operation on the first mapping function based on the detected scene cut data using one or more smoothing windows of different window lengths.

Embodiment 15 is a method of embodiment 13, further comprising converting the second mapping function to coefficients of piecewise polynomials to generate the composer metadata.

Embodiment 16 is a method of embodiment 4, wherein determining the second mapping function comprises solving a least square problem to compute multivariate multiple regression (MMR) matrix coefficients based on chroma statistics of pixels of the first and the second images.

Embodiment 17 is a method of embodiment 16, wherein solving the least square problem includes minimizing a difference function.

Embodiment 18 is a method of embodiment 4, further comprising performing a color space conversion on one or more images of the input video stream.

Embodiment 19 is a method of embodiment 4, wherein the composer metadata is carried to a target display device in a video signal as a part of image metadata separate from the first image.

Embodiment 20 is a method of embodiment 4, further comprising generating a display management (DM) metadata based on a fourth sliding window, the DM metadata to be used by a target display device to generate the second image optimized for the target display.

Embodiment 21 is a method of embodiment 4, wherein generating the composer metadata comprises generating a unique metadata for each image.

Embodiment 22 is a method of embodiment 4, wherein generating the composer metadata comprises generating a unique metadata for each scene of the input video stream.

Embodiment 23 is a method of embodiment 4, wherein at least one of the first or the second images are represented in one of: an IPT PQ (ICtCp) color space, an YCbCr color space, an RGB color space, a Rec. 2020 color space, a Rec. 709 color space, an enhanced or extended dynamic range (EDR) color space, a gamma/HLG/PQ color space, or a standard dynamic range (SDR) color space.

Embodiment 24 is a method of embodiment 4, wherein the first image includes a bit depth of one of 8, 9, 10, or 11+ bits.

Embodiment 25 is a method of embodiment 4, wherein the second image includes a bit depth of one of 8, 9, 10, 11, 12, 13, 14, or 15+ bits.

Embodiment 26 is a non-transitory machine readable medium with stored instructions which when executed by a display management system cause the system to perform a method as in any one of embodiments 4-25.

Embodiment 27 is a display management system which includes a memory and a processing system configured to perform a method as in any one of embodiment 4-25.

Embodiment 28 is a method for luma/chroma reshaping with a processor using three-dimensional (3D) mapping statistics, the method comprises receiving an input video stream having a set of images, including a first image in a first dynamic range. The method comprises generating 3D mapping statistics for the first image and a second image in a second dynamic range which correspond to the first image, wherein the second dynamic range is higher than the first dynamic range. The method comprises determining multivariate multiple regression (MMR) statistics based on the 3D mapping statistics to generate chroma mapping functions to estimate chroma channels values of the second image based on the first image. The method comprises generating a composer metadata, wherein the composer metadata comprising the chroma mapping functions to be used by a target display device to map chroma channels of the first image from the first dynamic range into the second dynamic range for display.

Embodiment 29 is a method of embodiment 28, wherein the 3D mapping statistics include a 3D histogram representing quantization of the first image, wherein the first image is quantized by: initializing a plurality of bins for the 3D histogram, each bin representing a number of pixels having corresponding color channels; scanning a plurality of pixels of the first image; and incrementing a counter for each of the plurality of bins corresponding to color channels of the scanned pixel.

Embodiment 30 is a method of embodiment 29, wherein the 3D histogram has a maximum bin count that is constant for future input images of the input video stream in time.

Embodiment 31 is a method of embodiment 30, wherein each dimension of the 3D histogram corresponds to a color channel of the first image.

Embodiment 32 is a method of embodiment 28, wherein the 3D mapping statistics for the second image include averaged 3D chroma channels mapping values.

Embodiment 33 is a method of embodiment 28, wherein the averaged 3D chroma channels mapping values are separate values for each of the color channels.

Embodiment 34 is a method of embodiment 28, wherein determining multivariate multiple regression (MMR) statistics comprises determining multivariate multiple regression (MMR) statistics based on 3D flattened mapping tables, each 3D flattened mapping table representing one of the plurality of bins of the first image so the luma/chroma mapping has no majority pixel bias.

Embodiment 35 is a method of embodiment 34, wherein the 3D flattened mapping tables are calculated based on a plurality of flattened mapping values representing center values for bins of a 3D histogram.

Embodiment 36 is a method of embodiment 35, wherein generating a composer metadata comprises generating MMR coefficients by solving a least square problem for the MMR statistics.

Embodiment 37 is a method of embodiment 36, wherein the MMR statistics comprises cumulative sum MMR matrices.

Embodiment 38 is a method of embodiment 36, wherein solving a least square problem for the MMR statistics comprises minimizing a difference function.

Embodiment 39 is a method of embodiment 28, further comprising performing a color space conversion on one or more frames of the input video stream.

Embodiment 40 is a method of embodiment 28, wherein the composer metadata is carried to a target display device in a video signal as a part of video frame metadata separate from the first image.

Embodiment 41 is a method of embodiment 28, wherein generating the composer metadata comprises generating a unique metadata for each video frame.

Embodiment 42 is a method of embodiment 28, wherein generating the composer metadata comprises generating a unique metadata for each scene of the input video stream.

Embodiment 43 is a method of embodiment 28, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

Embodiment 44 is a method of embodiment 28, wherein the first image includes a bit depth of one of 8, 9, 10, or 11+ bits.

Embodiment 45 is a method of embodiment 28, wherein the second image includes a bit depth of one of 8, 9, 10, 11, 12, 13, 14, or 15+ bits.

Embodiment 46 is a non-transitory machine readable medium with stored instructions which when executed by a display management system cause the system to perform a method as in any one of embodiment 28-45.

Embodiment 47 is a display management system which includes a memory and a processing system configured to perform a method as in any one of embodiment 28-45.

Embodiment 48 is a method for luma and/or chroma reshaping with a processing system, the method comprises receiving an input video stream containing images in a first dynamic range including a first image. The method comprises obtaining statistical data for a first image of the input video stream, wherein the statistical data includes one or more image-related features from the first image. The method comprises determining, at a first time delay, a scene cut data from data representing images in the input video stream and storing the scene cut data in a first sliding window based on the statistical data of the first image, the statistical data of one or more look ahead images after the first image in time in the input video stream, and the statistical data of one or more look back images before the first image in time in the input video stream. The method comprises determining, at a second time delay, a first mapping function for mapping luminance values for the first image from the first dynamic range into a second dynamic range based on a second sliding window and a machine learning model. The method comprises determining, at a third time delay, a second mapping function by performing a smoothing operation to the first mapping function based on a third sliding window. The method comprises generating, at the third time delay, a composer metadata for the first image based on the first and a second mapping functions, wherein the second mapping functions maps chroma color channels for the first image from the first dynamic range into the second dynamic range based on the machine learning model, wherein the generated composer metadata are used by a target display device to display a second image, which corresponds to the first image in the second dynamic range.

Embodiment 49 is a method of embodiment 48, wherein the composer metadata is generated in a linear fashion by receiving an input image from the input video stream and producing an output composer metadata as one operation such that one input results in one output.

Embodiment 50 is a method of embodiment 48, wherein each of the first and second sliding windows is a buffer that, over time, receives successive portions of the input video stream, each of the portions storing data for a set of consecutive images such that the buffer slides over time over the input video stream.

Embodiment 51 is a method of embodiment 48, wherein the smoothing operation is performed on the first mapping function based on the scene cut data in the third sliding window.

Embodiment 52 is a method of embodiment 51, wherein the first, second, and third sliding windows include ring memory buffers with configurable buffer lengths.

Embodiment 53 is a method of embodiment 52, wherein the statistical data are obtained in a statistics ring buffer with a configurable buffer length, wherein the buffer length is configured based on the buffer lengths of the first, second, and third sliding windows.

Embodiment 54 is a method of embodiment 48, wherein the obtained statistical data includes scene cut data, min/max/average luminance values, luminance histogram, and chroma saturation values for each bin of a luminance histogram for the first image.

Embodiment 55 is a method of embodiment 54, wherein the luminance histogram corresponds to a down-sampled first image to reduce a computational load, wherein the first image is downsampled by dividing the codewords for pixels of the first image into a predetermined number of non-overlapping bins.

Embodiment 56 is a method of embodiment 48, wherein the one or more image-related features comprises a combination of averaged first, second, third, and fourth orders, of minimum, maximum, and mean pixel values of the first image.

Embodiment 57 is a method of embodiment 48, wherein the one or more image-related features comprises an averaged luminance histogram.

Embodiment 58 is a method of embodiment 48, wherein the one or more image-related features comprises averaged chroma saturation values for bins of a luminance histogram.

Embodiment 59 is a method of embodiment 48, wherein the first sliding window includes one or more scene cut flags corresponding to new scenes in the corresponding images of the first sliding window.

Embodiment 60 is a method of embodiment 48, wherein the machine learning model predicts luminance values for the second image based the one or more image-related features.

Embodiment 61 is a method of embodiment 48, wherein the machine learning model includes a general linear model (GLM).

Embodiment 62 is a method of embodiment 48, further comprising converting the first mapping function to coefficients of piecewise polynomials to generate the composer metadata.

Embodiment 63 is a method of embodiment 48, further comprising generating display management (DM) metadata based on a fourth sliding window, the DM metadata to be used by a target display device to generate the second image optimized for the target display.

Embodiment 64 is a method of embodiment 48, further comprising performing a color space conversion on one or more images of the input video stream.

Embodiment 65 is a method of embodiment 48, wherein the composer metadata is carried to a target display device in a video signal as a part of image metadata separate from the first image.

Embodiment 66 is a method of embodiment 48, wherein generating the composer metadata comprises generating a unique metadata for each image.

Embodiment 67 is a method of embodiment 48, wherein generating the composer metadata comprises generating a unique metadata for each scene of the input video stream.

Embodiment 68 is a method of embodiment 48, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

Embodiment 69 is a method of embodiment 48, wherein the first image includes a bit depth of one of 8, 9, 10, or 11+ bits.

Embodiment 70 is a method of embodiment 48, wherein the second image includes a bit depth of one of 8, 9, 10, 11, 12, 13, 14, or 15+ bits.

Embodiment 71 is a non-transitory machine readable medium with stored instructions which when executed by a display management system cause the system to perform a method as in any one of embodiments 48-70.

Embodiment 72 is a display management system which includes a memory and a processing system configured to perform a method as in any one of embodiments 48-70.

Table 13 below illustrates a list of notations.

TABLE 13

| Symbol | Meaning |
| --- | --- |
| $f_t^S$ | SDR frame at t |
| $f_t^V$ | reference HDR frame at t |
| $f_t$ | SDR or HDR frame at t (when the dynamic range need not be specified) |
| $(\tau_3^a, \tau_3^b)$ | Number of "look-ahead" and "lookback" frames for L3 window |
| $(\tau_2^a, \tau_2^b)$ | Number of "look-ahead" and "lookback" frames for L2 window |
| $(\tau_1^a, \tau_1^b)$ | Number of "look-ahead" and "lookback" frames for L1 window |
| $(\tau_{DM}^a, \tau_{DM}^b)$ | Number of "look-ahead" and "lookback" frames for DM window |
| $\tau_{tot}$ | Total output delay (latency) |
| $\eta_{buf}$ | Minimum required length of a ring buffer in our linear architecture |
| $(t_{SC,L2}^{(l)}, t_{SC,L2}^{(r)})$ | Left and right scene boundaries for L2 window |
| $(t_{SC,L1}^{(l)}, t_{SC,L1}^{(r)})$ | Left and right scene boundaries for L1 window |
| $(t_{SC,DM}^{(l)}, t_{SC,DM}^{(r)})$ | Left and right scene boundaries for DM window |
| $(S_{t,i}^y, S_{t,i}^{c0}, S_{t,i}^{c1})$ | $i^{th}$ pixel value of Y, Cb and Cr channels respectively for $f_t^S$ |
| $(V_{t,i}^y, V_{t,i}^{c0}, V_{t,i}^{c1})$ | $i^{th}$ pixel value of Y, Cb and Cr channels respectively for $f_t^V$ |
| P | number of luma pixels in a frame |
| $P_C$ | number of chroma pixels in a frame (e.g. $P_C$ = P/4 for 4:2:0 subsampling) |
| $S_{t,i}^{y,d}$ | $i^{th}$ pixel value of the downsampled Y component for $f_t^s$ (number of pixels = Pc) |
| $s_{bitdepth}$ | SDR (source) signal bit-depth |
| $v_{bitdepth}$ | HDR (reference) signal bit-depth |
| $(s_t^L, s_t^H, s_t^M)$ | Min/max/mean luma values of $f_t^S$ |
| $(v_t^L, v_t^H, v_t^M)$ | Min/max/mean luma values of $f_t^V$ |
| $h_{t,b}^s$ | b'th bin value of the luma histogram of $f_t^S$ |
| $h_{t,b}^v$ | b'th bin value of the luma histogram of $f_t^V$ |
| $h_{t,b}^{C,s}$ | b'th bin value of the cumulative luma histogram of $f_t^S$ |

TABLE 13-continued

| Symbol | Meaning |
|---|---|
| $h_{t,b}^{C,v}$ | b'th bin value of the cumulative luma histogram of $f_t^V$ |
| $M^s$ | Number of non-overlapping bins for SDR histogram computation |
| $M^v$ | Number of non-overlapping bins for HDR histogram computation |
| $w_{bS}$ | Codeword interval for each SDR histogram bin |
| $w_{bV}$ | Codeword interval for each HDR histogram bin |
| $s_{t,i}$ | $i^{th}$ SDR pixel vector for $f_t^S$ |
| $\bar{s}_{t,i}$ | MMR polynomial vector for ith SDR pixel for $f_t^S$ |
| $v_{t,i}$ | Chroma vector for $i^{th}$ HDR pixel for $f_t^V$ |
| $\hat{V}_{t,i}^{c0}, \hat{V}_{t,i}^{c1}$ | Predicted chroma values for $i^{th}$ HDR pixel for $f_t^V$ |
| $\hat{v}_{t,i}$ | Predicted chroma vector for $i^{th}$ HDR pixel for $f_t^V$ |
| $M_t^{L1}$ | Final MMR coefficient matrix for $f_t$ (generated at L1 sliding window) |
| $T_{t,b}^{L1}$ | $b^{th}$ bin value of final luma BLUT for $f_t$ (generated at L1 window) |
| $r_{ds}$ | Downsampling ratio of number of pixels for MMR computations |
| $P_{ds}$ | number of pixels considered from a frame for MMR computations |
| $\hat{V}_t$ | Predicted HDR chroma matrix for $f_t^V$ |
| $V_t$ | Reference HDR chroma matrix for $f_t^V$ |
| $\bar{S}_t$ | SDR chroma MMR polynomial matrix for $f_t^S$ |
| $A_t, B_t$ | Intermediate matrices stored for MMR computations |
| $A_t^C, B_t^C$ | Cumulative sums of the intermediate matrices stored for MMR computations |
| $SC_t$ | Scene-cut flag for $f_t$ |
| $c_b^s$ | $b^{th}$ bin value of SDR luma CDF |
| $c_b^v$ | $b^{th}$ bin value of HDR luma CDF |
| $\tilde{T}_b$ | $b^{th}$ bin value of an intermediate (temporary) luma BLUT |
| $T_{t,b}^{C,Lx}$ | Cumulative $b^{th}$ bin value of luma BLUT for $f_t$, generated at Lx window |
| $Q_y, Q_{C_0}, Q_{C_1}$ | Number of bins for luma and chroma channels used for 3D-FMT SDR histogram |
| $\Omega_t^{Q,s}$ | 3D histogram of $f_t^s$ |
| $Q = [Q_y, Q_{C_0}, Q_{C_1}]$ | Configuration specifying the number of bins in each dimension of 3D-FMT |
| $q = (q_y, q_{C_0}, q_{C_1})$ | Vector specifying bin index at $q_y, q_{C_0}, q_{C_1}$ in 3D-FMT |
| $(s_q^{y,(B)}, s_q^{C_0,(B)}, s_q^{C_1,(B)})$ | The center Y, Cb, Cr co-ordinates of q-bin |
| $\psi_{t,C_0}^{Q,v}$ | Mapped EDR chroma values for Cb channel for $f_t^V$ for the Q-bin 3D-FMT |
| $\psi_{t,C_1}^{Q,v}$ | Mapped EDR chroma values for Cr channel for $f_t^V$ for the Q-bin 3D-FMT |
| $\bar{\psi}_{t,C_0}^{Q,v}$ | Average (over $\Omega_t^{Q,s}$) mapped EDR chroma values for Cb channel for $f_t^V$ for the Q-bin 3D-FMT |
| $\bar{\psi}_{t,C_1}^{Q,v}$ | Average (over $\Omega_t^{Q,s}$) mapped EDR chroma values for Cr channel for $f_t^V$ for the Q-bin 3D-FMT |
| $\bar{s}_{t,qi}$ | MMR polynomial vector for $q_i$'th bin for $f_t^S$ |
| $\bar{h}_{t,N_L}^y$ | $N_L$-bin luma histogram for $f_t^S$ |
| $\bar{\pi}_{t,NC}$ | $N_C$-bin chroma saturation in each luma bin for $f_t^S$ |
| $g_{t,j,k}$ | k'th individual feature in the j'th feature vector for $f_t^S$ |
| $g_{t,j}$ | j'th feature vector for $f_t^S$ |
| $(s_t^{L,L2}, s_t^{H,L2}, s_t^{M,L2})$ | First order min/max/mean features for $f_t^S$ after L2-window |
| $(\{s_t^{L,L2}\}^k, \{s_t^{H,L2}\}^k, \{s_t^{M,L2}\}^k)$ | k'th order min/max/mean features for $f_t^S$ after L2-window |
| $\bar{h}_{t,N_L}^{y,L2}$ | Luma histogram feature for $f_t^S$ after L2-window |
| $\bar{\pi}_{t,NC}^{L2}$ | Chroma saturation in luma bin for $f_t^S$ after L2-window |
| $G_j$ | Total number of features for j'th feature vector |
| $F_t$ | Feature vector of GLM for $f_t^S$ |
| $W$ | The coefficient (or weight)-matrix of GLM |
| $v_{t,p}^R, v_{t,p}^G, v_{t,p}^B$ | Composed RGB EDR image R, G and B components (P: Total number of pixels od the composed image) |
| $L_t^{avg}$ | EDR frame average for $f_t$ computed for DM estimation |
| $\bar{L}_t^{avg}$ | Window-based EDR frame average for $f_t$ computed for DM estimation |
| $L^{std}$ | EDR frame standard deviation for $f_t$ computed for DM estimation |

Various aspects of the present invention may be appreciated from the following enumerated example embodiments (EEEs):

1. A method for luma and/or chroma reshaping with a processing system, the method comprising:

receiving an input video stream containing images in a first dynamic range including a first image;

receiving a second image representing the first image of the input video stream, the second image having a second dynamic range, wherein the second dynamic range is higher than the first dynamic range;

obtaining statistical data for the first and the second images;

determining, at a first time delay, a scene cut data from data representing images in the input video stream and storing the scene cut data in a first sliding window, the scene cut data determined based on the statistical data of the first image, the statistical data of one or more look ahead images after the first image in time in the input video stream, and the statistical data of one or more look back images before the first image in time in the input video stream;

determining, at a second time delay, a first mapping function for mapping luminance values for the first image from the first dynamic range into the second dynamic range based on a second sliding window and the determined scene cut data;

determining, at a third time delay, a second mapping function by performing a smoothing operation to the first mapping function based on a third sliding window and the determined scene cut data;

determining, at the third time delay, a third mapping function for mapping chroma values for the first image from the first dynamic range into the second dynamic range based on the third sliding window and the determined scene cut data; and generating, at the third time delay, a composer metadata for the first image based on the second and the third mapping functions, wherein the generated composer metadata are used by a target display device to map the first image from the first dynamic range into the second dynamic range for display.

2. The method of EEE 1, wherein the composer metadata is generated in a linear fashion by receiving an input image from the input video stream and producing an output composer metadata as one operation such that one input results in one output.

3. The method of any preceding EEE, wherein each of the first, second, and third sliding windows is a buffer that, over time, receives successive portions of the input video stream, each of the portions storing data for a set of consecutive images such that the buffer slides over time over the input video stream.

4. The method of any preceding EEE, wherein the first, second, and third sliding windows include ring memory buffers with configurable buffer lengths.

5. The method of EEE 4, wherein the statistical data are obtained in a statistics ring buffer with a configurable buffer length, wherein the buffer length is configured based on the buffer lengths of the first, second, and third sliding windows.

6. The method of any preceding EEE, wherein the obtained statistical data includes scene cut data, luminance, and chroma statistics for the first and second images.

7. The method of any preceding EEE, wherein the first sliding window includes one or more scene cut flags corresponding to new scenes in the corresponding images of the first sliding window, the scene cut flags to cause a smoothing applied to the first mapping function for each scene.

8. The method of any preceding EEE, wherein the second sliding window includes histogram statistics of the first and second images, wherein the histogram statistics include one or more bins representing codewords for pixels of the first or the second images respectively.

9. The method of EEE 8, wherein the histogram statistics includes down-sampled first and second images to reduce a computational load, wherein the first and the second images are down-sampled by dividing the codewords for pixels of the first or the second images respectively into a predetermined number of non-overlapping bins.

10. The method of any preceding EEE, wherein determining the first mapping function comprises determining a luminance mapping function based on a first and a second cumulative histograms, wherein the first and the second cumulative histograms are computed from luminance statistics of the first and second images respectively.

11. The method of EEE 10, further comprising performing a smoothing operation on the first mapping function based on the detected scene cut data using one or more smoothing windows of different window lengths.

12. The method of EEE 10 or EEE 11, further comprising converting the second mapping function to coefficients of piecewise polynomials to generate the composer metadata.

13. The method of any preceding EEE, wherein determining the second mapping function comprises solving a least square problem to compute multivariate multiple regression (MMR) matrix coefficients based on chroma statistics of pixels of the first and the second images.

14. The method of EEE 13, wherein solving the least square problem includes minimizing a difference function.

15. The method of any preceding EEE, further comprising performing a color space conversion on one or more images of the input video stream.

16. The method of any preceding EEE, wherein the composer metadata is carried to a target display device in a video signal as a part of image metadata separate from the first image.

17. The method of any preceding EEE, further comprising generating a display management (DM) metadata based on a fourth sliding window, the DM metadata to be used by a target display device to generate the second image optimized for the target display.

18. The method of any preceding EEE, wherein generating the composer metadata comprises generating a unique metadata for each image.

19. The method of any preceding EEE, wherein generating the composer metadata comprises generating a unique metadata for each scene of the input video stream.

20. The method of any preceding EEE, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

21. The method of any preceding EEE, wherein the first image includes a bit depth of one of 8, 9, 10, or 11+ bits.

22. The method of any preceding EEE, wherein the second image includes a bit depth of one of 8, 9, 10, 11, 12, 13, 14, or 15+ bits.

23. A non-transitory machine readable medium with stored instructions which when executed by a display management system cause the system to perform a method as in any one of EEEs 1-22.

24. A display management system which includes a memory and a processing system configured to perform a method as in any one of EEEs 1-22.

25. A method for luma/chroma reshaping with a processor using three-dimensional (3D) mapping statistics, the method comprising:

receiving an input video stream having a set of images, including a first image in a first dynamic range;

generating 3D mapping statistics for the first image and a second image in a second dynamic range which correspond to the first image, wherein the second dynamic range is higher than the first dynamic range;

determining multivariate multiple regression (MMR) statistics based on the 3D mapping statistics to generate chroma mapping functions to estimate chroma channels values of the second image based on the first image; and generating a composer metadata, wherein the composer metadata comprising the chroma mapping functions to be used by a target display device to map chroma channels of the first image from the first dynamic range into the second dynamic range for display.

26. The method of EEE 25, wherein the 3D mapping statistics include a 3D histogram representing quantization of the first image, wherein the first image is quantizing by:

initializing a plurality of bins for the 3D histogram, each bin representing a number of pixels having corresponding color channels;

scanning a plurality of pixels of the first image; and incrementing a counter for each of the plurality of bins corresponding to color channels of the scanned pixel.

27. The method of EEE 26, wherein the 3D histogram has a maximum bin count that is constant for future input images of the input video stream in time.

28. The method of EEE 27, wherein each dimension of the 3D histogram corresponds to a color channel of the first image.

29. The method of any one of EEEs 25 to 28, wherein the 3D mapping statistics for the second image include averaged 3D chroma channels mapping values.

30. The method of EEE 29, wherein the averaged 3D chroma channels mapping values are separate values for each of the color channels.

31. The method of any one of EEEs 25 to 30, wherein determining multivariate multiple regression (MMR) statistics comprises determining multivariate multiple regression (MMR) statistics based on 3D flattened mapping tables, each 3D flattened mapping table representing one of the plurality of bins of the first image so the luma/chroma mapping has no majority pixel bias.

32. The method of EEE 31, wherein the 3D flattened mapping tables are calculated based on a plurality of flattened mapping values representing center values for bins of a 3D histogram.

33. The method of EEE 32, wherein generating a composer metadata comprises generating MMR coefficients by solving a least square problem for the MMR statistics.

34. The method of EEE 33, wherein the MMR statistics comprises cumulative sum MMR matrices.

35. The method of EEE 34, wherein solving a least square problem for the MMR statistics comprises minimizing a difference function.

36. The method of any one of EEEs 25 to 35, further comprising performing a color space conversion on one or more frames of the input video stream.

37. The method of any one of EEEs 25 to 36, wherein the composer metadata is carried to a target display device in a video signal as a part of video frame metadata separate from the first image.

38. The method of any one of EEEs 25 to 37, wherein generating the composer metadata comprises generating a unique metadata for each video frame.

39. The method of any one of EEEs 25 to 38, wherein generating the composer metadata comprises generating a unique metadata for each scene of the input video stream.

40. The method of any one of EEEs 25 to 39, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

41. The method of any one of EEEs 25 to 40, wherein the first image includes a bit depth of one of 8, 9, 10, or 11+ bits.

42. The method of any one of EEEs 25 to 41, wherein the second image includes a bit depth of one of 8, 9, 10, 11, 12, 13, 14, or 15+ bits.

43. A non-transitory machine readable medium with stored instructions which when executed by a display management system cause the system to perform a method as in any one of EEEs 25-42.

44. A display management system which includes a memory and a processing system configured to perform a method as in any one of EEEs 25-42.

45. A method for luma and/or chroma reshaping with a processing system, the method comprising:

receiving an input video stream containing images in a first dynamic range including a first image;

obtaining statistical data for a first image of the input video stream, wherein the statistical data includes one or more image-related features from the first image;

determining, at a first time delay, a scene cut data from data representing images in the input video stream and storing the scene cut data in a first sliding window based on the statistical data of the first image, the statistical data of one or more look ahead images after the first image in time in the input video stream, and the statistical data of one or more look back images before the first image in time in the input video stream;

determining, at a second time delay, a first mapping function for mapping luminance values for the first image from the first dynamic range into a second dynamic range based on a second sliding window and a machine learning model;

determining, at a third time delay, a second mapping function by performing a smoothing operation to the first mapping function based on a third sliding window and the determined scene cut data; and generating, at the third time delay, a composer metadata for the first image based on the second and a third mapping functions, wherein the third mapping functions maps chroma color channels for the first image from the first dynamic range into the second dynamic range based on the machine learning model, wherein the generated composer metadata are used by a target display device to display a second image, which corresponds to the first image in the second dynamic range.

46. The method of EEE 45, wherein the composer metadata is generated in a linear fashion by receiving an input image from the input video stream and producing an output composer metadata as one operation such that one input results in one output.

47. The method of EEE 45 or 46, wherein each of the first and second sliding windows is a buffer that, over time, receives successive portions of the input video stream, each of the portions storing data for a set of consecutive images such that the buffer slides over time over the input video stream.

48. The method of any one of EEEs 45 to 47, wherein the smoothing operation is performed on the first mapping function based on the scene cut data in the third sliding window.

49. The method of EEE 48, wherein the first, second, and third sliding windows include ring memory buffers with configurable buffer lengths.

50. The method of EEE 49, wherein the statistical data are obtained in a statistics ring buffer with a configurable buffer length, wherein the buffer length is configured based on the buffer lengths of the first, second, and third sliding windows.
51. The method of any one of EEEs 45 to 50, wherein the obtained statistical data includes scene cut data, min/max/average luminance values, luminance histogram, and chroma saturation values for each bin of a luminance histogram for the first image.
52. The method of EEE 51, wherein the luminance histogram includes a downsampled histogram, wherein the downsampled histogram is downsampled by dividing the codewords for pixels of the first image into a predetermined number of non-overlapping bins.
53. The method of any one of EEEs 45 to 52, wherein the one or more image-related features comprises a combination of averaged first, second, third, and fourth orders, of minimum, maximum, and mean pixel values of the first image.
54. The method of any one of EEEs 45 to 53, wherein the one or more image-related features comprises an averaged luminance histogram.
55. The method of any one of EEEs 45 to 54, wherein the one or more image-related features comprises averaged chroma saturation values for bins of a luminance histogram.
56. The method of any one of EEEs 45 to 55, wherein the first sliding window includes one or more scene cut flags corresponding to new scenes in the corresponding images of the first sliding window.
57. The method of any one of EEEs 45 to 56, wherein the machine learning model predicts luminance values for the second image based the one or more image-related features.
58. The method of any one of EEEs 45 to 57, wherein the machine learning model includes a general linear model (GLM).
59. The method of any one of EEEs 45 to 58, further comprising converting the first mapping function to coefficients of piecewise polynomials to generate the composer metadata.
60. The method of any one of EEEs 45 to 59, further comprising generating display management (DM) metadata based on a fourth sliding window, the DM metadata to be used by a target display device to generate the second image optimized for the target display.
61. The method of any one of EEEs 45 to 60, further comprising performing a color space conversion on one or more images of the input video stream.
62. The method of any one of EEEs 45 to 61, wherein the composer metadata is carried to a target display device in a video signal as a part of image metadata separate from the first image.
63. The method of any one of EEEs 45 to 62, wherein generating the composer metadata comprises generating a unique metadata for each image.
64. The method of any one of EEEs 45 to 63, wherein generating the composer metadata comprises generating a unique metadata for each scene of the input video stream.
65. The method of any one of EEEs 45 to 64, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.
66. The method of any one of EEEs 45 to 65, wherein the first image includes a bit depth of one of 8, 9, 10, or 11+ bits.
67. The method of any one of EEEs 45 to 66, wherein the second image includes a bit depth of one of 8, 9, 10, 11, 12, 13, 14, or 15+ bits.
68. A non-transitory machine readable medium with stored instructions which when executed by a display management system cause the system to perform a method as in any one of EEEs 45-67.
69. A display management system which includes a memory and a processing system configured to perform a method as in any one of EEEs 45-67.

What is claimed is:
1. A method for luma and chroma reshaping metadata generation with a processing system, the method comprising:
receiving an input video stream containing images in a first dynamic range including a first image;
receiving a second image representing the first image of the input video stream, the second image having a second dynamic range, wherein the second dynamic range is higher than the first dynamic range;
obtaining statistical data for the first and the second images, wherein the obtained statistical data includes luminance and chroma statistics for the first and second images, and storing the statistical data in a buffer;
determining, at a first time delay, scene cut data based on the statistical data in a first sliding window (L3) including the first image, one or more look ahead images after the first image in time in the input video stream, and one or more look back images before the first image in time in the input video stream;
determining, at a second time delay, a first mapping function for mapping luminance values for the first image from the first dynamic range into the second dynamic range based on the statistical data and determined scene cut data in a second sliding window (L2), wherein data in the second sliding window are determined based on data in the first sliding window;
determining, at a third time delay, a second mapping function by performing a smoothing operation to the first mapping function based on the first mapping function and the determined scene cut data in a third sliding window (L1), wherein data in the third sliding window are determined based on data in the second sliding window;
determining, at the third time delay, a third mapping function for mapping chroma values for the first image from the first dynamic range into the second dynamic range based on the statistical data and the determined scene cut data in the third sliding window (L1); and
generating, at the third time delay, a composer metadata for the first image based on the second and the third mapping functions, wherein the generated composer metadata are used by a target display device to map the first image from the first dynamic range into the second dynamic range for display.
2. The method of claim 1, wherein the processing system is a linear encoder, the linear encoder having a configurable time delay between an input frame and a corresponding composer metadata.
3. The method of claim 1, wherein each of the first, second, and third sliding windows is a buffer that, over time, receives successive portions of the input video stream, each of the portions storing data for a set of consecutive images such that the buffer slides over time over the input video stream.

4. The method of claim 1, wherein the first, second, and third sliding windows are implemented as ring memory buffers with configurable buffer lengths.

5. The method of claim 4, wherein the statistical data are obtained in a statistics ring buffer with a configurable buffer length, wherein the buffer length is configured based on the buffer lengths of the first, second, and third sliding windows.

6. The method of claim 4, wherein the ring memory buffer implementing the second sliding window stores histogram statistics of the first and second images, wherein the histogram statistics include one or more bins representing codewords for pixels of the first or the second images respectively.

7. The method of claim 6, wherein the histogram statistics are down-sampled by dividing the codewords for pixels of the first or the second images respectively into a predetermined number of non-overlapping bins.

8. The method of claim 1, wherein determining the first mapping function comprises determining a luminance mapping function based on a first and a second cumulative histograms, wherein the first and the second cumulative histograms are computed from luminance statistics of the first and second images respectively.

9. The method of claim 8, wherein the second mapping function is a backward reshaping look-up table (BLUT).

10. The method of claim 9, further comprising performing a smoothing operation on the first mapping function based on the detected scene cut data using one or more smoothing windows of different window lengths.

11. The method of claim 10, further comprising converting the second mapping function to coefficients of piecewise polynomials to generate the composer metadata.

12. The method of claim 1, wherein determining the third mapping function comprises solving a least square problem to compute multivariate multiple regression (MMR) matrix coefficients based on chroma statistics of pixels of the first and the second images.

13. A non-transitory machine readable medium with stored instructions which when executed by a display management system cause the system to perform a method as in claim 1.

14. A display management system which includes a memory and a processing system configured to perform a method as in claim 1.

* * * * *